(12) United States Patent
Lang et al.

(10) Patent No.: US 12,519,912 B2
(45) Date of Patent: Jan. 6, 2026

(54) PROJECTION ADJUSTMENT SYSTEM AND METHOD, AND PROJECTION COLOR ADJUSTMENT SYSTEM AND METHOD

(71) Applicant: NINGBO SUNNY AUTOMOTIVE OPTECH CO., LTD., Yuyao (CN)

(72) Inventors: Haitao Lang, Yuyao (CN); Jia Yang, Yuyao (CN); Heteng Zhang, Yuyao (CN); Yan Zhou, Yuyao (CN); Dingming Yang, Yuyao (CN)

(73) Assignee: NINGBO SUNNY AUTOMOTIVE OPTECH CO., LTD., Ningbo (CN)

( * ) Notice: Subject to any disclaimer, the term of this patent is extended or adjusted under 35 U.S.C. 154(b) by 1124 days.

(21) Appl. No.: 17/620,376

(22) PCT Filed: Apr. 1, 2020

(86) PCT No.: PCT/CN2020/082674
§ 371 (c)(1),
(2) Date: Dec. 17, 2021

(87) PCT Pub. No.: WO2020/200217
PCT Pub. Date: Oct. 8, 2020

(65) Prior Publication Data
US 2022/0256130 A1 Aug. 11, 2022

(30) Foreign Application Priority Data

Apr. 2, 2019 (CN) .......................... 201910260310.X
Jun. 17, 2019 (CN) .......................... 201910520480.7

(51) Int. Cl.
*G03B 21/20* (2006.01)
*H04N 9/31* (2006.01)
(52) U.S. Cl.
CPC ....... *H04N 9/3182* (2013.01); *G03B 21/2053* (2013.01); *H04N 9/3194* (2013.01)

(58) Field of Classification Search
CPC .. H04N 9/3158; H04N 9/3182; H04N 9/3164; G03B 21/2053; G03B 21/201; G03B 21/2033; G03B 21/204
See application file for complete search history.

(56) References Cited

U.S. PATENT DOCUMENTS

| 5,519,518 A | 5/1996 | Watanabe et al. |
| 5,597,223 A | 1/1997 | Watanabe et al. |

(Continued)

FOREIGN PATENT DOCUMENTS

| CN | 103297734 A | 9/2013 |
| CN | 105042518 A | 11/2015 |

(Continued)

OTHER PUBLICATIONS

International Search Report, issued in PCT/CN2020/082674, dated Jun. 30, 2020.

(Continued)

*Primary Examiner* — Ryan D Howard
(74) *Attorney, Agent, or Firm* — Birch, Stewart, Kolasch & Birch, LLP

(57) ABSTRACT

The present disclosure provides a projection adjustment system and method, and a projection color adjustment system and method. The projection adjustment system comprises an illumination module, a projection module, and a variable diaphragm control module, wherein the illumination module casts light carrying imaging information, wherein the projection module obtains the light carrying the imaging information and then casts it outward to a projection plane, wherein the variable diaphragm control module comprises at least one variable diaphragm and a controller, and wherein each variable diaphragm adjusts at least one diaphragm aperture of the variable diaphragm under the control of the controller, and the light intensity of the light (Continued)

cast outward is adjusted by reducing or enlarging the diaphragm aperture.

14 Claims, 11 Drawing Sheets

(56) References Cited

U.S. PATENT DOCUMENTS

| | | | |
|---|---|---|---|
| 2006/0279710 A1* | 12/2006 | Tani | H04N 9/3114 348/E5.142 |
| 2009/0128451 A1* | 5/2009 | Tokui | H04N 9/73 345/55 |
| 2014/0192331 A1 | 7/2014 | Toyooka | |
| 2017/0089758 A1* | 3/2017 | Okamoto | G03B 21/006 |

FOREIGN PATENT DOCUMENTS

| | | | |
|---|---|---|---|
| CN | 105388693 A | 3/2016 | |
| CN | 105892211 A | 8/2016 | |
| CN | 108490623 A | 9/2018 | |
| CN | 208367345 U | 1/2019 | |
| JP | 2006-285089 A | 10/2008 | |
| JP | 2008-309835 A | 12/2008 | |
| JP | 2010-169729 A | 8/2010 | |
| JP | 2017-38204 A | 2/2017 | |

OTHER PUBLICATIONS

Written Opinion of the International Searching Authority, issued in PCT/CN2020/082674, dated Jun. 30, 2020.

\* cited by examiner

PROJECTION ADJUSTMENT SYSTEM AND METHOD, AND PROJECTION COLOR ADJUSTMENT SYSTEM AND METHOD

CROSS REFERENCE TO RELATED APPLICATIONS

This application is the National Phase of PCT International Application No. PCT/CN2020/082674, filed on Apr. 1, 2020, which claims priority under 35 U.S.C. 119(a) to Patent Application Nos. 20/191,0260310.X, filed in China on Apr. 2, 2019 and 201910520480.7, filed in China on Jun. 17, 2019, all of which are hereby expressly incorporated by reference into the present application.

TECHNICAL FIELD

The present disclosure relates to the field of projection imaging, and in particular to a projection adjustment system and method, and a projection color adjustment system and method.

BACKGROUND

Head-up displays, or HUDs for short, are commonly used in aircrafts to reduce the frequency of pilots looking down at instruments, which improves driving safety. Nowadays, HUDs have begun to enter the field of automobile safety. Information such as concerning instrumentation, navigation, and safety can be displayed on the windshield, and is reflected to a human eye. After the human eye receives driving-related information, comprehensive driving-related information can be received without lowering the head. A picture generation unit (PGU) system is a kind of HUD internal light emitting system, wherein the PGU system has both illumination and projection functions. Moreover, variable diaphragms are widely used in the fields of photography and industrial lenses, and can improve the imaging quality of the lenses and eliminate the stray light in the lens systems.

In the prior art, the PGU system in the traditional HUD has poor adjustability of its own optical performance. Once the performance adjustment in the assembly stage is completed, the optical performance cannot adapt to the changes in the external environment to ensure the clarity of the projection image, thereby ensuring that the provision of projection information is stable and safe. Under normal circumstances, when the external environment light is stronger, the brightness of the projection image of the PGU system is relatively low, so that the driver cannot clearly observe the image information of the HUD system and cannot obtain accurate information, and when the external environment light is weaker, the stray light inside the system may be relatively clear, which causes the contrast performance of the projection image cast by the PGU system to decrease, and the imaging quality of the HUD system is poor. If the PGU system cannot adapt, it will not only affect the driver's eye comfort, causing the driver's eye fatigue, but also even cause safety accidents in more serious cases.

Therefore, there is an urgent need for a HUD head-up display that can ensure a clear vision of the driver under various light intensities, and is comfortable with the eyes.

In the high-speed information society, the use of picture generation to realize digital informatization is an important means of people's production and life. For example, picture generation unit (Projection Graphic Unit, PGU) systems, and microelectromechanical systems (MEMS) are widely used in the technical fields such as illumination and projection.

For example, the PGU system is a system for casting pictures. The PGU system has both illumination and projection functions, and is often used in cinema projection, small projection equipment and other technologies. With the advent of intelligent automobile technology, the projection display system used in vehicle-mounted projection display has become a new technological innovation. For example, the PGU system is applied to a vehicle-mounted head-up display system, where the driver and co-pilot can directly see various information of the vehicle and the real-world navigation of the road by projecting them on the windshield in front of the driver.

In the existing PGU system, a certain ratio of RGB (Red Green Blue) three-color light source is used to emit light, and after the light is homogenized and turned by an optical lens module, a corresponding image presentation is projected by a digital micro mirror device (DMD). It is worth mentioning that during the process of the three-color light source casting a certain ratio of three-color light, the light source heats up, and the color temperature and brightness of the certain ratio of the three-color light cast by the light source fluctuate as the working temperature changes. Furthermore, the greater the temperature difference of the light source itself, the greater the fluctuation of the color temperature and brightness of the light cast by it, so that the projection effect of the PGU system is relatively unstable during the long-term projection of the PGU system, thereby limiting the development of the PGU system. As a result, the PGU system cannot be used for a long time in application equipment that requires more precise projection effects.

For example, when the PGU system is applied to a vehicle-mounted head-up display system, if the long-term stable and safe projection effect cannot be obtained, it may cause the driver to fail to clearly learn the information projected by the PGU system, and misjudgment during driving may even endanger driving safety.

In order to solve the problem of the color deviation of the existing PGU system, a detection device is applied to the PGU system. Moreover, in the existing PGU system, the detection equipment is disposed outside the light path to receive the radiated stray light, and then it can be detected in real time whether the color of the PGU system has deviation.

It is worth mentioning that when the light cast by the light source can be cast to an imaging unit in a more matched manner, the efficiency of the light cast by the light source is improved, and the projection efficiency and projection accuracy are effectively improved. At the same time, it is more energy-saving. The existing detection device uses a way of detecting the stray light in the PGU system to sense the chromaticity value of the light. Since there is not much radiated stray light in the PGU system, and the energy carried by the stray light is relatively low, detecting the color of the light through the stray light cannot meet the requirements of real-time stable sensing by the detection equipment. High-precision, high-sensitivity detection equipment can compensate for the low light efficiency and low energy of stray light to a certain extent. However, the high-sensitivity detection equipment not only increases the production cost of the PGU system, but also cannot effectively improve the feedback accuracy of high-sensitivity detection equipment. Moreover, it cannot solve the problem that stray light could be stably used for detection in real time, and cannot meet the requirements of stable color adjustment.

SUMMARY

A first aspect of the present application relates to a projection adjustment system and a projection adjustment method.

According to the first aspect of the present application, an advantage of the present disclosure is to provide a projection adjustment system and a projection adjustment method thereof, wherein the brightness and contrast of the projection image are adaptively adjusted under different external light intensities.

Another advantage of the present disclosure is to provide a projection adjustment system and a projection adjustment method thereof, wherein the cast projection presentation can adapt to be comfortably received by the driver under different external light intensities.

Another advantage of the present disclosure is to provide a projection adjustment system and a projection adjustment method thereof, wherein different external light intensities can be adapted by adjusting the intensity of the projected light.

Another advantage of the present disclosure is to provide a projection adjustment system and a projection adjustment method thereof, wherein at least one variable diaphragm is used to adjust the definition of the projection image under different external light intensities.

Another advantage of the present disclosure is to provide a projection adjustment system and a projection adjustment method thereof, wherein a variable diaphragm is disposed at an appropriate position for projection to improve the image quality of the HUD system.

Another advantage of the present disclosure is to provide a projection adjustment system and a projection adjustment method thereof, wherein through a combination of a variable diaphragm and an electrically controlled adjustment system, a diaphragm aperture of the variable diaphragm is automatically adjusted according to the intensity of the external ambient light, thereby adjusting the intensity of the projection light.

Another advantage of the present disclosure is to provide a projection adjustment system and a projection adjustment method thereof, wherein the size adjustment of the diaphragm aperture of the variable diaphragm is controlled by means of a controller, thereby controlling the intensity of the projection light.

Another advantage of the present disclosure is to provide a projection adjustment system and a projection adjustment method thereof, wherein by means of a light sensing module, the light sensing module detects the brightness and contrast of the projection image and sends them to the controller, and the variable diaphragm reduces or enlarges the size of the diaphragm aperture under the control of the controller.

Another advantage of the present disclosure is to provide a projection adjustment system and a projection adjustment method thereof, wherein the number of variable diaphragms is at least two, and the sizes of the diaphragm apertures are adjusted separately under the control of the controller so as to control the light intensity and contrast for outward cast of the projection adjustment system.

Another advantage of the present disclosure is to provide a projection adjustment system and a projection adjustment method thereof, wherein the projection adjustment system comprises a projection module, at least one variable diaphragm is disposed on the projection module, and wherein the projection module receives the light carrying imaging information and then casts it outward.

Another advantage of the present disclosure is to provide a projection adjustment system and a projection adjustment method thereof, wherein the projection adjustment system comprises an illumination module, and at least one variable diaphragm can be disposed on the illumination module of the projection adjustment system, and wherein the illumination module provides light carrying imaging information to the projection module.

Another advantage of the present disclosure is to provide a projection adjustment system and a projection adjustment method thereof, wherein at least one variable diaphragm can be disposed on the effective light path cast from the illumination module to the projection module, and wherein the variable diaphragm adjusts its diaphragm aperture so as to adjust the light flux.

Another advantage of the present disclosure is to provide a projection adjustment system and a projection adjustment method thereof, wherein at least one variable diaphragm is disposed on the exit light path of the illumination module, and when the light of the external ambient light is weak, due to the stray light inside the projection adjustment system, it will be relatively clear, and wherein at least one of the variable diaphragms reduces the diaphragm aperture to reduce the stray light entering the illumination module, thereby maintaining the contrast of the light carrying imaging information, so that the light carrying the imaging information cast outward can be clearly received by the human eye.

Another advantage of the present disclosure is to provide a projection adjustment system and a projection adjustment method thereof, wherein the projection adjustment system can meet the brightness requirements of different drivers, protect eyesight, and improve the visual experience of the drivers.

According to a configuration form of the present disclosure, a projection adjustment system of the present disclosure that can achieve the foregoing objectives and other objectives and advantages comprises:

an illumination module, wherein the illumination module casts light carrying imaging information;

a projection module, wherein the projection module obtains the light carrying the imaging information and then casts it outward to a projection plane; and a variable diaphragm control module, wherein the variable diaphragm control module comprises at least one variable diaphragm and a controller, and wherein each variable diaphragm adjusts at least one diaphragm aperture of the variable diaphragm under the control of the controller, and light intensity of the light cast outward is adjusted by reducing or enlarging the diaphragm aperture.

According to an embodiment of the present disclosure, the variable diaphragm control module comprises a first variable diaphragm, and wherein the first variable diaphragm is controlled by the controller to adjust a size of the diaphragm aperture thereof.

According to an embodiment of the present disclosure, the first variable diaphragm is disposed on a light path of the illumination module.

According to an embodiment of the present disclosure, the variable diaphragm control module further comprises a second variable diaphragm, and wherein the first variable diaphragm and the second variable diaphragm are controlled by the controller to adjust their respective diaphragm apertures.

According to an embodiment of the present disclosure, a position where the second variable diaphragm is disposed is selected from a position group consisting of a position disposed in an exit direction of the illumination module and in an incident direction of the projection module, and a position disposed on a light path of the projection module.

According to an embodiment of the present disclosure, the illumination module further comprises a light source unit, a light processing unit, and an imaging unit, wherein the light processing unit obtains light provided by the light source unit to the light processing unit and then guides and processes the light, and wherein the light guided and processed by the light processing unit is imaged by the imaging unit, and then the light carrying the imaging information is reflected.

According to an embodiment of the present disclosure, the first variable diaphragm is disposed in an incident direction of the imaging unit, and regulates a light flux of light passing through it before the light is imaged by the imaging unit.

According to an embodiment of the present disclosure, a position of the first variable diaphragm is selected from a position group consisting of a position disposed in an exit direction of the light source unit and disposed in an incident direction of the light processing unit, a position where the first variable diaphragm is disposed on a light path of the light processing unit, and a position disposed in an exit direction of the light processing unit and disposed in an incident direction of the imaging unit.

According to an embodiment of the present disclosure, the light processing unit comprises a collimating unit, and wherein the first variable diaphragm is disposed on an exit path of the collimating unit and disposed in an incident direction of the imaging unit.

According to an embodiment of the present disclosure, the light processing unit comprises a fly-eye lens system, a relay lens system, and a light guide element, wherein the fly-eye lens system is disposed in an exit direction of the light source unit; wherein the relay lens system is disposed in an exit direction of the fly-eye lens system and in an incident direction of the light guide element; wherein light is homogenized by the fly-eye lens system and then shaped by the relay lens system; wherein the light guide element obtains the light shaped by the relay lens system and then guides the light to the imaging unit; and wherein a position of the variable diaphragm is selected from a position group consisting of a position disposed in the exit direction of the fly-eye lens system and disposed in an incident direction of the relay lens system, a position disposed in the exit direction of the fly-eye lens system and disposed in the incident direction of the light guide element, and a position disposed in an exit direction of the light guide element and disposed in an incident direction of the imaging unit.

According to an embodiment of the present disclosure, the relay lens system further comprises a first relay lens, a reflector, and a second relay lens; wherein the first relay lens obtains the light homogenized by the fly-eye lens system, and then shapes and casts it to the reflector; wherein the reflector reflects the light to the second relay lens; wherein the light reflected by the reflector is shaped and cast by the second relay lens to the light guide element; and wherein the position of the first variable diaphragm is selected from a position group consisting of a position disposed on an exit path of the first relay lens and disposed on an incident path of the reflector, and a position disposed on an exit path of the reflector and disposed on an incident path of the second relay lens.

According to an embodiment of the present disclosure, the projection adjustment system further comprises a light sensing module, wherein the light sensing module obtains light intensity of an external environment and then sends a light intensity electric signal to the controller, and wherein each variable diaphragm is controlled by the controller in a coordinated manner to adjust the respective diaphragm aperture.

According to an embodiment of the present disclosure, each variable diaphragm further comprises at least one diaphragm plate and a driver, wherein each diaphragm plate is disposed on a light path of the light, wherein at least one diaphragm plate is driven by the driver to be reciprocally movable relative to the diaphragm aperture, and wherein the diaphragm plates jointly defines the diaphragm aperture, and when at least one diaphragm plate is farther away from the diaphragm aperture and the diaphragm aperture of the variable diaphragm becomes larger, a light flux of light passing through increases; and when at least one diaphragm plate is closer to the diaphragm aperture and the diaphragm aperture of the variable diaphragm becomes smaller, the light flux of the light passing through decreases.

According to an embodiment of the present disclosure, the variable diaphragm further comprises a fixed body and at least one rotating shaft respectively connected to each diaphragm plate, wherein each diaphragm plate is driven by a corresponding rotating shaft to rotate so as to reciprocate relative to an effective light path of the light, wherein the rotating shafts are driven by the driver, and wherein the rotating shafts are rotatably connected to the fixed body.

According to another configuration form of the present disclosure, the present disclosure further provides a projection adjustment method, comprising the following steps:
(a) casting light carrying projection information outward to a projection plane; and
(b) adjusting a light flux of the cast light by adjusting a diaphragm aperture of at least one variable diaphragm.

According to an embodiment of the present disclosure, the step (a) of the projection adjustment method further comprises the following steps:
(a1) after obtaining light with predetermined light intensity, guiding the light so that the light is processed;
(a2) after obtaining the guided light, imaging the light to output light carrying imaging information; and
(a3) transmitting the light to the projection plane.

According to an embodiment of the present disclosure, before the step (b), the projection adjustment method further comprises the following steps:
(c) obtaining light intensity of an external environment in real time; and
(d) after processing an obtained external light intensity signal, controlling the diaphragm aperture of each variable diaphragm.

According to an embodiment of the present disclosure, the step (b) of the projection adjustment method further comprises the following steps:
(b1) by means of a first variable diaphragm, controllably adjusting a size of a diaphragm aperture of the first variable diaphragm, thereby adjusting a light flux of the light allowed to pass through; and
(b2) by means of a second variable diaphragm, controllably adjusting a size of a diaphragm aperture of the second variable diaphragm, thereby adjusting the light flux of the light allowed to pass through.

According to an embodiment of the present disclosure, the step (b1) of the projection adjustment method occurs during the step (a1) of the projection adjustment method.

According to an embodiment of the present disclosure, the step (b2) of the projection adjustment method occurs during the step (a3) of the projection adjustment method.

According to an embodiment of the present disclosure, the step (b2) of the projection adjustment method occurs after the step (a2) of the projection adjustment method and before the step (a3) of the projection adjustment method.

According to an embodiment of the present disclosure, before the step (a1), the projection adjustment method further comprises the following steps:
(a0) after casting a three-color light, combining the light.

According to an embodiment of the present disclosure, the step (b2) of the projection adjustment method occurs during the step (a0) of the projection adjustment method.

A second aspect of the present application relates to a projection color adjustment system and a projection color adjustment method.

According to the second aspect of the present application, an advantage of the present disclosure is to provide a projection color adjustment system and a method thereof, wherein the brightness of the light source is adjusted after real-time sensing of the chromaticity value of the effective light so as to realize real-time adjustment of the color of the projection presentation.

Another advantage of the present disclosure is to provide a projection color adjustment system and a method thereof, wherein the chromaticity value of the effective light is sensed in real time in a manner of guiding out the light ray for being detected in the light in real time.

Another advantage of the present disclosure is to provide a projection color adjustment system and a method thereof, wherein the light source casts light, and wherein the imaging light ray in the light is used for imaging, and the detecting light ray in the light, in a guided-out manner, is used to adjust the color of the light source.

Another advantage of the present disclosure is to provide a projection color adjustment system and a method thereof, wherein the difference between the color of the light and the preset color is sensed in real time in a manner of guiding out the light ray for being detected in the light, and a preset color of light is provided in a manner of correcting the chromaticity value of cast light in real time so as to provide accurate color sensing results.

Another advantage of the present disclosure is to provide a projection color adjustment system and a method thereof, wherein the light ray for being detected in the light is guided out in real time for sensing, without affecting the projection effect of the imaging light ray in the light to be projected.

Another advantage of the present disclosure is to provide a projection color adjustment system and a method thereof, wherein the projection color adjustment system comprises an illumination module, a color adjustment module, and a projection module; light ray for being detected in the effective light is guided out from the light by the color adjustment module; wherein the color adjustment module senses the light ray for being detected without affecting the projection effect of the imaging light ray of the light, so that under the premise of ensuring the projection effect, the color adjustment module senses the chromaticity value of the light ray for being detected in real time and then adjusts the chromaticity value of the light cast by the illumination module, and thus the energy of the light ray for being detected can be stably ensured, ensuring the stability of the detection; and wherein the light carrying the projection presentation, which is reflected after being imaged by the imaging unit, is transmitted by the projection module so as to cast the projection presentation outward.

Another advantage of the present disclosure is to provide a projection color adjustment system and a method thereof, wherein the projection color adjustment system controls the electrical current of lamp bead of the light source to adjust the luminous brightness of the lamp bead, realizing a color dynamic adjustment system with low cost and high feedback adjustment accuracy.

Another advantage of the present disclosure is to provide a projection color adjustment system and a method thereof, wherein the projection color adjustment system guides out the light ray for being detected in the effective light for the purpose of detecting the chromaticity value of the effective light, thereby realizing real-time monitoring of the color of the light.

Another advantage of the present disclosure is to provide a projection color adjustment system and a method thereof, wherein the color adjustment module comprises a guide unit and a sensing element, wherein the guide unit is disposed on the light path of the illumination module for guiding out the detecting light ray in the light to the sensing element, and wherein the sensing element senses the chromaticity value of the light.

Another advantage of the present disclosure is to provide a projection color adjustment system and a method thereof, wherein the guide unit is implemented as a light guide column, wherein the light guide column is disposed on the effective light path of the light to be cast, so that the light ray for being detected in the effective light can be guided out to the sensing element, and wherein the guide unit provides the sensing element with the effective light in real time, so that the sensing element can sense the chromaticity value of the light in real time.

Another advantage of the present disclosure is to provide a projection color adjustment system and a method thereof, wherein the projection color adjustment system further comprises a color adjustment module, wherein the color adjustment module receives an electrical signal of a color difference value sent by the color adjustment module, and then adjusts the color of the illumination module.

Another advantage of the present disclosure is to provide a projection color adjustment system and a method thereof, wherein the illumination module comprises a light source unit, an optical element group, and an imaging unit, wherein the light source unit provides light to the optical element group, and the optical element group guides the imaging light ray in the light to the imaging unit, wherein the imaging unit reflects the light carrying the imaging presentation after imaging, and wherein the color adjustment module guides out the light ray for being detected from the effective light in real time for the purpose of color adjustment of the illumination module.

Another advantage of the present disclosure is to provide a projection color adjustment system and a method thereof, wherein the guide unit is disposed in the optical element group, and wherein the optical element group comprises at least one optical element, and the guide unit is implemented as a through hole of an optical element in the optical element group; when the optical element reflects light, the light ray for being detected in the effective light is cast to the sensing unit by the guide unit, so that the light ray for being detected in the light can be used for sensing without affecting the projection effect of the imaging light ray in the light to be cast.

Another advantage of the present disclosure is to provide a projection color adjustment system and a method thereof, wherein the optical element group comprises a prism, and wherein the prism guides light to the imaging unit, which is more helpful for correcting light spots and improving the projection quality.

Another advantage of the present disclosure is to provide a projection color adjustment system and a method thereof, wherein the guide unit is disposed on the prism, and guides the light ray for being detected in the effective light to the sensing unit, so that the light ray for being detected is used for sensing, and wherein the imaging light ray of the light is used for imaging stably.

Another advantage of the present disclosure is to provide a projection color adjustment system and a method thereof, wherein the guide unit is a polarizing element, and wherein the guide unit guides out a small part of light to the sensing unit in a polarization manner so as to realize the separation of the light ray for being detected and the imaging light ray.

Another advantage of the present disclosure is to provide a projection color adjustment system and a method thereof, wherein the guide unit is coated on the prism in a film-coated manner, so that after the light on the effective light path is received, the light ray for being detected is transmitted out in a polarization manner and the imaging light ray is reflected to the imaging unit.

Another advantage of the present disclosure is to provide a projection color adjustment system and a method thereof, wherein the guide unit is implemented as a polarizer, wherein the polarizer is disposed on the effective light path of the optical element group, and wherein the polarizer guides out the light ray for being detected in the light in a polarization manner, so that the light ray for being detected can be used for sensing in real time.

Another advantage of the present disclosure is to provide a projection color adjustment system and a method thereof, wherein the optical element group comprises at least one reflector sheet, of which one reflector sheet reflects light, and wherein the guide unit is a through hole of the optical lens piece to transmit the light ray for being detected in the light to the sensing unit.

Another advantage of the present disclosure is to provide a projection color adjustment system and a method thereof, wherein the optical element group comprises at least one fly-eye lens system, wherein the fly-eye lens system transmits imaging light ray and homogenizes the imaging light ray so as to improve the imaging effect of projection.

Another advantage of the present disclosure is to provide a projection color adjustment system and a method thereof, wherein the guide unit is implemented as a light guide column, and the guide unit is disposed in the fly-eye lens system to guide out the light ray for being detected in the light and then sense the light ray for being detected.

Another advantage of the present disclosure is to provide a projection color adjustment system and a method thereof, wherein the guide unit can be implemented as being disposed in the optical element group in a polarizing film-coated manner, to allow a part of the polarized light to be guided to the sensing unit, so that the sensing unit can continuously receive effective light.

Another advantage of the present disclosure is to provide a projection color adjustment system and a method thereof, wherein the guide unit is implemented as a polarizing lens piece, wherein the guide unit is disposed on the effective light path of the light, and the position where the guide unit is disposed is not limited, and wherein the guide unit guides out the light ray for being detected in the light in a polarization manner for the purpose of color adjustment, and the imaging light ray in the light is used for projection.

Another advantage of the present disclosure is to provide a projection color adjustment system and a method thereof, wherein the guide unit is implemented as a light guide lens piece, wherein the guide unit is disposed on the effective light path of the light, and the position where the guide unit is disposed is not limited, and wherein the guide unit guides out the light ray for being detected in the light in a manner of reflecting the light ray for being detected in the light for the purpose of color adjustment, and the imaging light ray in the light is transmitted in a transmission manner for projection.

Another advantage of the present disclosure is to provide a projection color adjustment system and a method thereof, wherein the projection module transmits the light whose color is corrected in real time, so that the color of the transmission presentation transmitted by the projection module is relatively stable.

Another advantage of the present disclosure is to provide a projection color adjustment system and a method thereof, wherein the optical element group comprises a fly-eye lens system, at least one relay lens, a reflector, and a prism, wherein the fly-eye lens system transmits effective light and homogenize the effective light, wherein the relay lens transmits the effective light and shapes the effective light, wherein the reflector reflects the light to guide the direction of the effective light, and the prism guides the effective light and corrects the light spots to improve the projection quality so as to obtain a better projection effect.

Another advantage of the present disclosure is to provide a projection color adjustment system and a method thereof, wherein the optical element group comprises two relay lenses, wherein the reflector is disposed between the two relay lenses, so that the two relay lenses and the reflector constitutes a relay lens system to realize shaping and guiding of the effective light.

Another advantage of the present disclosure is to provide a projection color adjustment system and a method thereof, which are suitable for being applied to the MEMS system, PGU system, or other projection systems comprising the illumination module and the color adjustment module, have a wide range of applications and can effectively improve the problem of projection color deviation.

According to a configuration form of the present disclosure, a projection color adjustment system of the present disclosure that can achieve the foregoing objectives and other objectives and advantages comprises:

an illumination module, wherein the illumination module comprises a light source unit, an optical element group, and an imaging unit, wherein the light source unit provides light to the optical element group, and the optical element group guides imaging light ray in effective light to the imaging unit, and wherein the imaging light ray is reflected by the imaging unit to form light carrying an imaging presentation;

a color adjustment module, wherein the color adjustment module is disposed on an exit path of the light source unit, and wherein the color adjustment module guides out light ray for being detected from the effective light in real time for color adjustment of the illumination module; and a projection module, the projection module casting the adjusted imaging light ray to form a presentation on a projection plane.

In the projection color adjustment system according to some embodiments, after the imaging unit receives the imaging light ray whose color is adjusted in real time, the imaging unit reflects the light carrying the imaging presentation to the projection module.

In the projection color adjustment system according to some embodiments, the projection color adjustment system comprises a guide unit and a sensing unit, and wherein the guide unit guides out the light ray for being detected in the light to the sensing unit, and the sensing unit senses a chromaticity value of the light ray for being detected in real time.

In the projection color adjustment system according to some embodiments, the color adjustment module further comprises a color difference adjustment unit, wherein the color difference adjustment unit receives the real-time chromaticity value of the light ray for being detected, provided by the sensing unit, to obtain a color difference value of the light ray for being detected, and then adjusts a chromaticity value of the light provided by the light source unit.

In the projection color adjustment system according to some embodiments, the light source unit comprising at least three light sources, wherein the color difference adjustment unit adjusts lamp bead brightness of each light source in a manner of adjusting an electrical current of each light source.

In the projection color adjustment system according to some embodiments, the guide unit is disposed on a light path of the optical element group, and the guide unit guides the light ray for being detected, other than the imaging light ray in the light, to the sensing unit.

In the projection color adjustment system according to some embodiments, the optical element group comprises at least one optical lens piece, and wherein the guide unit is disposed on the optical lens piece of the optical element group, to sense the chromaticity value of the light in a manner of guiding out the light ray for being detected in the light.

In the projection color adjustment system according to some embodiments, the guide unit is disposed between the light source unit and the optical element group, to sense the chromaticity value of the light in a manner of guiding out the light ray for being detected in the light.

In the projection color adjustment system according to some embodiments, the guide unit is disposed on an exit path of the optical element group and on an incident path of the imaging unit, to sense the chromaticity value of the light in a manner of guiding out the light ray for being detected in the light.

In the projection color adjustment system according to some embodiments, the guide unit is disposed on an exit path of the imaging unit, to sense the chromaticity value of the light in a manner of guiding out the light ray for being detected in the light.

In the projection color adjustment system according to some embodiments, the guide unit has a polarizing element as a guide element, and wherein the guide element is disposed on an effective light path of the light, and guides out the light ray for being detected in the light to the sensing unit in a polarization manner.

In the projection color adjustment system according to some embodiments, the guide unit is a polarizing film, and the guide unit is disposed on an effective light path in a film-coated manner.

In the projection color adjustment system according to some embodiments, the guide unit guides out the light ray for being detected in the light to the sensing unit in a transmission manner.

In the projection color adjustment system according to some embodiments, the guide unit has a light guide column as a guide element, and wherein the guide element is disposed on a light path of at least one optical lens piece and guides out the light ray for being detected in the light to the sensing unit in real time.

In the projection color adjustment system according to some embodiments, the guide unit has a light guide channel as a guide element, wherein the guide element is disposed on the optical lens piece and on an effective light path, and wherein the light guide channel guides out the light ray for being detected in the light to the sensing unit.

In the projection color adjustment system according to some embodiments, the optical lens piece where the light guide column is located is a fly-eye lens system.

In the projection color adjustment system according to some embodiments, the optical element group comprises at least one reflector sheet, of which one reflector sheet reflects light, and wherein the guide unit is a through hole of the optical lens piece to transmit the light ray for being detected in the light to the sensing unit.

In the projection color adjustment system according to some embodiments, the guide unit is a light guide lens piece, and wherein the light guide lens piece guides out the light ray for being detected in the effective light to the sensing unit and casts the imaging light ray in the effective light.

According to another configuration form of the present disclosure, the present disclosure provides a projection color adjustment method, comprising the following steps:
(a) sensing light ray for being detected in the light guided out from a light path;
(b) matching a color difference value of the light ray for being detected in real time; and
(c) adjusting a color difference value of light cast by at least one light source.

In the projection color adjustment method according to some embodiments, the step
(b) of the projection color adjustment method further comprises the following steps:
(b1) comparing a chromaticity value of the light ray for being detected that is sensed with a preset database; and
(b2) obtaining a color difference value of light cast by each light source.

In the projection color adjustment method according to some embodiments, the step
(c) of the projection color adjustment method further comprises the following steps:
(c1) adjusting brightness of light cast by the three-color light source in a manner of controlling a lamp bead flow rate of the three-color light source.

In the projection color adjustment method according to some embodiments, the step
(a) of the projection color adjustment method further comprises the following steps:
(a1) before the light is imaged, guiding out the light ray for being detected in the light in real time; and
(a2) sensing the light guided out in real time.

Further objectives and advantages of the present disclosure will be fully embodied through the understanding of the following description and the drawings.

These and other objectives, features and advantages of the present disclosure are fully embodied by the following detailed description, drawings and claims.

DETAILED DESCRIPTION

Figure 1:
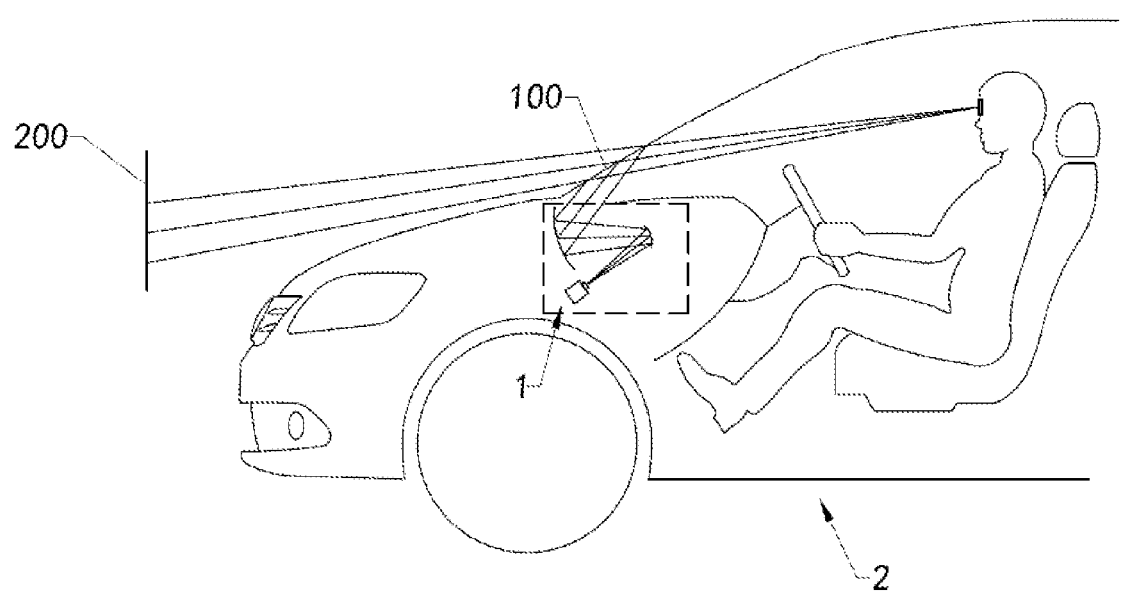
FIG. 1 is a schematic view of an application scene of a projection adjustment system according to a first preferred embodiment of the present disclosure.

The following description is presented to disclose the present application to enable those skilled in the art to practice the present disclosure. Preferred embodiments in the following description are by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present application.

It should be understood by those skilled in the art that in the disclosure of the present application, the orientation or positional relationship indicated by the terms "longitudinal", "transverse", "upper", "lower", "front", "rear", "left", "right", "vertical", "horizontal", "top", "bottom", "inside", "outside", etc. is based on the orientation or positional relationship shown in the drawings, which is merely for the convenience of describing the present disclosure and simplifying the description, and does not indicate or imply that the mentioned device or element must have a particular orientation and be constructed and operated in the particular orientation. Therefore, the above terms cannot be construed as a limitation of the present application.

FIGS. 1 to 4 show some preferred implementations and partial details of a first aspect of the present application.

Figure 2:
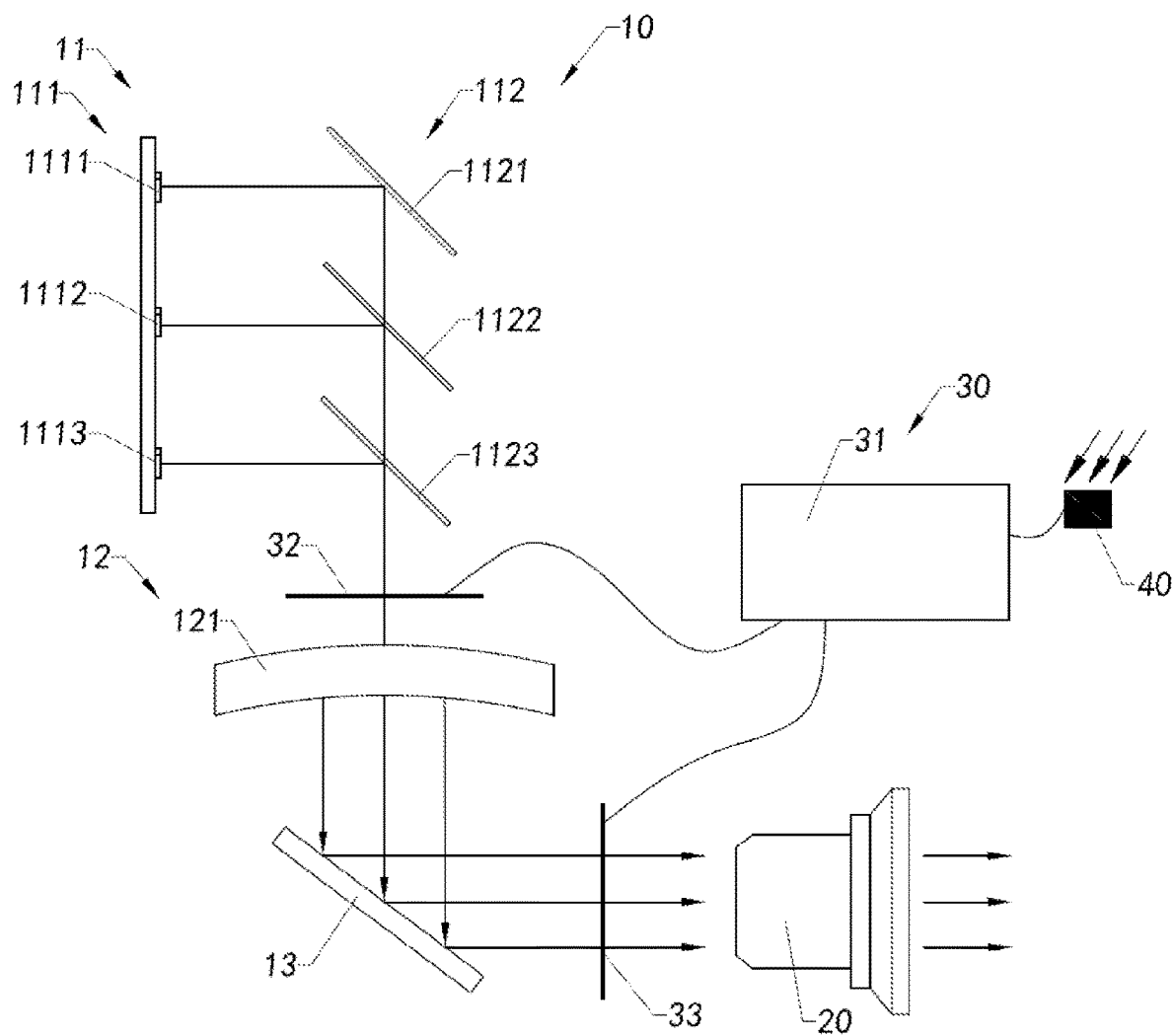
FIG. 2 is a schematic view of the projection adjustment system according to the first preferred embodiment of the present disclosure.
Figure 3:
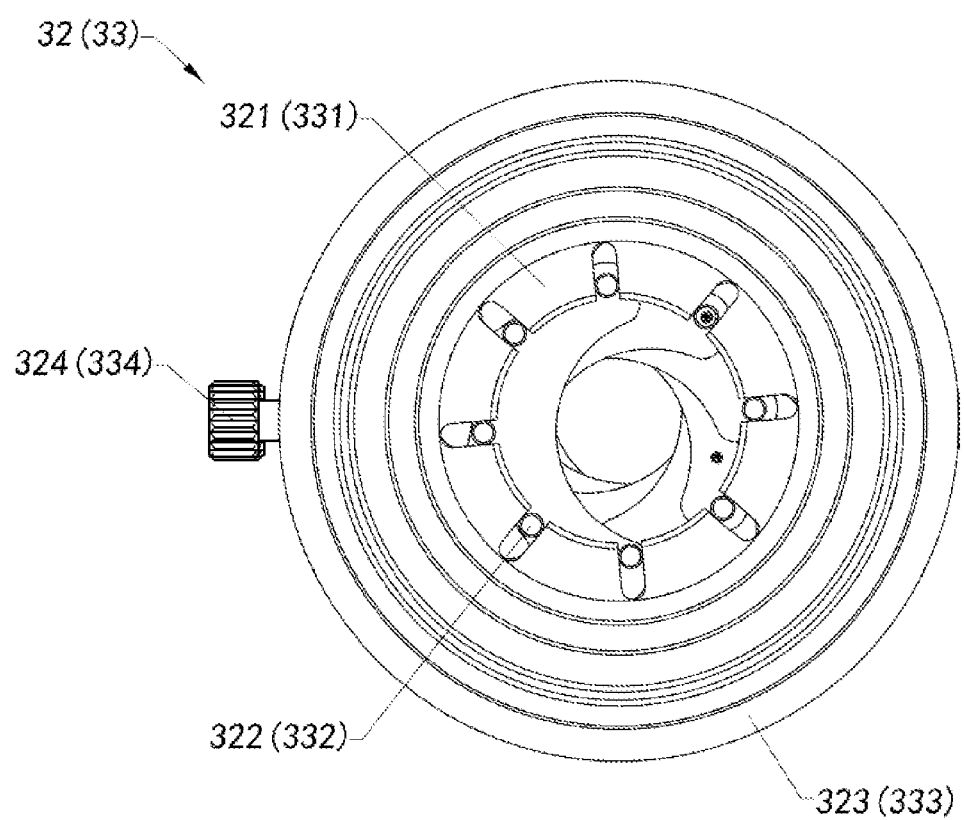
FIG. 3 is a schematic view of a diaphragm of the projection adjustment system according to the first preferred embodiment of the present disclosure.

Referring to FIGS. 1 to 3, a projection adjustment system and a projection adjustment method thereof according to a first preferred embodiment of the present application are disclosed and explained in detail. Referring to FIG. 1, the projection adjustment system 1 is applied to a vehicle 2, wherein by means of casting on a projection plane 100, a driver can obtain driving-related information through a head-up view to drive more safely and comfortably, which is helpful to the advancement and development of intelligent automobiles.

Referring to FIG. 2, the projection adjustment system 1 comprises an illumination module 10, a projection module 20, and a variable diaphragm control module 30, wherein the illumination module 10 provides light carrying imaging information to the projection module 20, and after obtaining the light carrying the imaging information provided by the illumination module 10, the projection module 20 casts the light carrying the imaging information outward to the projection plane 100. When the light intensity of an external environment is different, the variable diaphragm control module 30 can adaptively adjust the light flux of the projection light to adjust the brightness of the imaged presentation cast outward by the projection adjustment system 1, thereby satisfying that the driver can see projection information clearly and comfortably under different light intensities.

It is worth mentioning that the adjustment of the variable diaphragm control module 30 can realize real-time adjustment of the light intensity and contrast of the imaged presentation cast outward by the projection adjustment system 1, so that the driver can receive the projection information clearly and comfortably under the different light intensities of the external environment.

Preferably, in the first preferred embodiment of the present disclosure, the projection plane 100 is a windshield or an object disposed on the windshield, so that the driver can obtain driving-related information through a head-up view without looking down at the driving-related information.

It is worth mentioning that the driving-related information may include driving speed, fuel level, automobile failure reminder, fresh air system-related information, air-conditioning information, road information, navigation information and the like, and the present application is not limited thereto.

The variable diaphragm control module 30 comprises at least one variable diaphragm with a variable diaphragm aperture and a controller 31, wherein the controller 31 controls the diaphragm aperture of each variable diaphragm to be adjusted separately for different light fluxes to pass through. When the light intensity of the external environment is high, if the projection brightness is not high, the driver will not be able to see the projection information clearly. The variable diaphragm increases the diaphragm aperture under the control of the controller 31 to increase the light flux cast outward, so that in a high-intensity external environment, the driver can still receive clear projection information.

When the light intensity of the external environment is low, the stray light inside the projection control system is relatively clear, and the stray light from the external environment will enter the projection control system, which reduces the contrast of light carrying imaging information, so that the driver cannot receive clear imaging information. The variable diaphragm reduces the diaphragm aperture under the control of the controller 31, which can reduce the entry of stray light from the external environment and maintain the contrast of the projection presentation, so that the driver can clearly receive the imaging information carried by the light.

Furthermore, the projection adjustment system 1 can adapt to the intensity of the external ambient light to adjust the light intensity of its projection, so that when the projection adjustment system 1 is applied to the PGU system of the automobile, and the light intensity of the external environment changes or even differs greatly, the driver can still comfortably and clearly receive the imaging information provided by the projection adjustment system 1.

Preferably, the number of variable diaphragms is two, and they are a first variable diaphragm 32 and a second variable diaphragm 33, respectively. The first variable diaphragm 32 and the second variable diaphragm 33 are separately controlled by the controller 31 to adjust, and the diaphragm aperture L1 of the first variable diaphragm 32 and the diaphragm aperture L2 of the second variable diaphragm 33 are adjusted in a coordinated manner, so that the first variable diaphragm 32 and the second variable diaphragm 33 are jointly adjusted, thereby adjusting the brightness of the projection presentation cast outward by the projection adjustment system 1.

It is worth mentioning that in the first preferred embodiment of the present disclosure, it does not need to adjust the intensity of the light cast by the light source unit 31 to adjust the light intensity and contrast of the cast projection presentation, but the first variable diaphragm 32 and the second variable diaphragm 33 are coordinately adjusted to adjust the light intensity and contrast of the cast projection presentation.

Optionally, the controller 31 coordinately adjusts the intensity of the light cast by the light source unit 31 and the diaphragm apertures of the two variable diaphragms so as to control the brightness of the light cast outward by the projection adjustment system 1, and then adapt to the different light intensities of the external environment. Since the manner of controlling and adjusting the intensity of the light cast by the light source unit 31 and the diaphragm apertures of the two variable diaphragms is relatively complicated, their adjustments are relatively difficult. Only the adjustment of the diaphragm apertures of the variable diaphragms can not only effectively adjust the light intensity of the projection presentation, but also more adjustably control the amount of light from the external environment entering the projection adjustment system to reduce the effect of stray light on effective imaging light ray. Furthermore, the requirements for each light source of the light source unit 31 are reduced, and the service life of each light source of the light source unit 31 is increased.

The first variable diaphragm 32 is disposed in an incident direction of the second variable diaphragm 33. That is to say, the first variable diaphragm 32 and the second variable diaphragm 33 are sequentially disposed in the projection adjustment system 1 to jointly adjust the light flux of the projection adjustment system 1.

Preferably, the first variable diaphragm 32 is disposed in the illumination module 10, wherein the second variable diaphragm 33 is disposed in an exit direction of the light cast by the illumination module 10.

More preferably, the second variable diaphragm 33 is disposed in the projection module 20, wherein the second variable diaphragm 33 adjusts the light flux of the cast light and the stray light from the external environment entering the projection adjustment system 1.

The illumination module 10 comprises a light source unit 11, a light processing unit 12, and an imaging unit 13, wherein the light source unit 11 provides light to the light processing unit 12, wherein the light processing unit 12 guides the light so that the light is processed, and wherein the imaging unit 13 obtains the light guided by the light processing unit 12 and then images and reflects the light, so that the light carrying the imaging information is cast to the projection module 20.

Preferably, the imaging unit 13 is implemented as an imaging chip 13, wherein the imaging chip 13 images the light after receiving the light directed by the light processing unit 12 and then reflects the light carrying the imaging information.

It is worth mentioning that the light source unit 11 provides light with predetermined brightness, and can also be controlled to provide light with variable brightness. In this respect, the present application is not limited in any way. The controller 31 can adjust the brightness and contrast of the light cast outward by the projection adjustment system 1 by means of jointly adjusting the light source unit 11, the first variable diaphragm 32 and the second variable diaphragm 33.

Preferably, the first variable diaphragm 32 is disposed on an effective light path of the light processing unit 12, wherein the cast light passes through the diaphragm aperture L1 of the first variable diaphragm 32 and then is cast. By controlling the diaphragm aperture L1 of the first variable diaphragm 32, it is possible to change the light flux of the cast light on the effective light path of the light, so that the intensity of the light cast outward by the projection adjustment system 1 is adjusted.

Optionally, the first variable diaphragm 32 may be disposed on an exit path of the light source unit 11 and held in an incident direction of the light processing unit 12, so that the light cast by the light source unit 11 passes through the diaphragm aperture L1 of the first variable diaphragm 32 and then is obtained by the light processing unit 12.

The light processing unit 12 is implemented as a collimating lens piece 121, wherein the collimating lens piece 121 obtains light provided by the light source unit 11 and then collimates the light so as to cast the collimated light toward the imaging chip 13.

Preferably, the first variable diaphragm 32 is disposed on an exit path of the collimating lens piece 121 and is held in an incident direction of the imaging chip 13. In other words, the first variable diaphragm 32 is disposed between the collimating lens piece 121 and the imaging chip 13. Further, the first variable diaphragm 32 controls the light flux of the light that is allowed to pass through by means of adjusting the size of the diaphragm aperture L1 thereof, thereby controlling the amount of the light cast to the imaging chip 13.

Further, the second variable diaphragm 33 is disposed in an exit direction of the imaging chip 13, wherein the second variable diaphragm 33 is controlled by the controller 31 to reduce or enlarge the diaphragm aperture L2 of the second variable diaphragm 33, so that the first variable diaphragm 32 and the second variable diaphragm 33 are controlled by the controller 31 to change the light flux of the light allowed to pass through according to the light intensity of the external environment.

Further, when the light intensity of the external environment is high, at least one of the first variable diaphragm 32 and the second variable diaphragm 33 enlarges its diaphragm aperture under the control of the controller 31. Preferably, the first variable diaphragm 32 enlarges its diaphragm aperture L1 under the control of the controller 31. In addition, the second variable diaphragm 33 enlarges its diaphragm aperture L2 under the control of the controller 31.

When the light intensity of the external environment is low, the internal stray light of the projection adjustment system 1 is relatively clear, which has a greater impact on the light carrying the projection information, so that the contrast of an image 200 projected by the projection adjustment system 1 is relatively low. In the external environment with low light intensity, the driver cannot comfortably and clearly see the image 200 projected by the projection adjustment system 1, so that the driver is prone to visual fatigue during driving, or even unable to obtain driving-related information in time, which may cause personal injury in more serious cases.

According to the first preferred embodiment of the present disclosure, the second variable diaphragm 33 and the first variable diaphragm 32 cooperate with each other to reduce the intensity of light cast outward by the projection adjustment system 1 and reduce the stray light of the external environment entering the projection adjustment system 1. When the light intensity of the external environment is low, the projection adjustment system 1 automatically improves the contrast performance of the PGU system by means of the regulation of the variable diaphragm control module 30, so that the quality of the image 200 is improved, and the presentation of the image 200 is clearer, so as to improve the comfort of the driver's eyes to obtain the projection information. When there is strong light in the external environment, the driver cannot clearly see the image 200 under strong light. The projection adjustment system 1 improves the brightness performance of the PGU system by means of the regulation of the variable diaphragm control module 30, so that the driver can clearly observe various information displayed by the HUD system under strong background light, so as to improve the comfort of the driver's eyes to obtain the projection information.

At least one of the first variable diaphragm 32 and the second variable diaphragm 33 reduces its diaphragm aperture under the control of the controller 31.

Preferably, the first variable diaphragm 32 reduces its diaphragm aperture L1 under the control of the controller 31 to reduce the light flux of the light cast passing through the diaphragm aperture L1 of the first variable diaphragm 32, so as to reduce the brightness of the light cast outward by the projection adjustment system 1, so that the driver can comfortably receive the projected image 200 in an external environment with low light intensity.

In addition, the second variable diaphragm 33 reduces its diaphragm aperture L2 under the control of the controller 31 to reduce the stray light in the external environment entering the projection adjustment system 1, so as to reduce the impact on the contrast of the light carrying the imaging information while reducing the intensity of the light cast outward by the projection adjustment system 1.

Preferably, the second variable diaphragm 33 may be disposed on an exit path of light carrying imaging information emitted by the imaging chip 13, and disposed on an incident path of the projection module 20, wherein the second variable diaphragm 33 adjusts its diaphragm aperture L2 to adjust the light intensity of the emitted light.

The imaging chip 13 may be implemented as a MEMS chip 13 or a DMD chip 13. When the imaging chip 13 is the MEMS chip 13, the projection adjustment system 1 is applied to a MEMS system. When the imaging chip 13 is the DMD chip, the projection adjustment system 1 is applied to a DLP system.

It should be understood and known by those skilled in the art that the type of the PGU system does not become a limitation of the features and scope of the present application.

The projection adjustment system 1 further comprises a light sensing module 40, wherein the light of the external environment is obtained by the light sensing module 40, wherein the light sensing module 40 sends an external light intensity signal to the controller 31 of the variable diaphragm control module 30, wherein the controller 31 adjusts at least one diaphragm aperture to control the intensity of the projection light, so as to adjust the clarity of the image 200 projected by the projection adjustment system 1 according to the light intensity of the external environment, so that the projected image 200 can be seen comfortably and clearly by the driver.

Optionally, the controller 31 obtains the light intensity of the external environment of other projection adjustment systems such as a cloud or other detection systems, so as to adjust the brightness and contrast of the light cast outward by the projection adjustment system 1 according to the light intensity of the external environment. In this regard, the present application is not limited in any way.

It is worth mentioning that the variable diaphragm control module 30 can change the brightness and contrast of the projection presentation cast by it as needed, and the controller 31 of the variable diaphragm control module 30 obtains a light intensity signal of the external environment provided by the light sensing module 40, and then adjusts the first variable diaphragm 32 and the second variable diaphragm 33 according to a corresponding preset adjustment scheme.

According to the first preferred embodiment of the present disclosure, the light source unit 11 comprises a three-color light source 111 and a beam combining assembly 112, wherein the three-color light source 111 casts three colors of light, and wherein the beam combining assembly 112 combines the light and then casts it to the light processing unit 12. Further, the beam combining assembly 112 combines the cast three-color light to the collimating lens piece 121.

The three-color light source 111 comprises a first light source 1111, a second light source 1112, and a third light source 1113, and the first light source 1111, the second light source 1112, and the third light source 1113 are arranged in sequence.

Preferably, the beam combining assembly 112 is at least three filters, wherein the beam combining assembly 112 comprises a first filter 1121, a second filter 1122, and a third filter 1123.

The first filter 1121 is disposed on a light exit path of the first light source 1111, wherein the second filter 1122 is disposed on a light exit path of the second light source 1112, wherein the third filter 1123 is disposed on a light exit path of the third light source 1113, and wherein the light exit paths of light cast by the first light source 1111, the second light source 1112, and the third light source 1113 are in the same direction, so that the light source unit 11 is arranged in a plane manner to reduce the space occupied by the light source unit 11, thereby further reducing the volume of the illumination module 10.

Preferably, the first light source 1111, the second light source 1112, and the third light source 1113 project light of three colors of green, blue, and red, respectively. Furthermore, the first light source 1111 casts green light, wherein the second light source 1112 casts blue light, wherein the third light source 1113 casts red light. The three-color light source is cast in such a manner that the color of the projection color adjustment system is more vivid. Further, the first filter 1121 reflects green light and transmits red and blue light, wherein the second filter 1122 reflects blue light and transmits green and red light, wherein the third filter 1123 reflects red light and transmits blue and green light, so that the beam combining assembly 112 combines the red light, blue light and green light to the beam combining assembly 112.

It should be understood and known by those skilled in the art that the layout of the light path of the light source unit 11 does not become a limitation of the features and scope of the present application that the light flux of the variable diaphragm control module 30 is adjusted to adapt to different external ambient light brightness.

Referring to FIG. 3, the first variable diaphragm 32 according to the first preferred embodiment of the present application is disclosed and explained in detail, wherein the first variable diaphragm 32 comprises at least one first diaphragm plate 321, at least one first rotating shaft 322, a first fixed body 323, and a first driver 324, and has the diaphragm aperture L1, wherein the first diaphragm plate 321 is rotatably disposed by the first rotating shaft 322 on the first fixed body 323, and defines the diaphragm aperture L1 of the first variable diaphragm 32, and wherein the first driver 324 is controlled by the controller 31 to drive the first rotating shaft 322 to rotate so as to drive the respective first diaphragm plates 321 to rotate.

Each first diaphragm plate 321 is stacked in sequence and arranged in a circle. Since the first diaphragm plates 321 can be rotated by the first rotating shaft 322, the respective first diaphragm plates 321 are together far away from a center of the first variable diaphragm 32 or together close to the center of the first variable diaphragm 32 so as to realize the position of the diaphragm aperture L1 of the first variable diaphragm 32.

Preferably, the first driver 324 is implemented as a voice coil motor 324, wherein the voice coil motor 324 drives the first diaphragm plates 321 to rotate.

Optionally, the first driver 324 drives the first diaphragm plates 321 to rotate in a magnetic manner. It should be understood and known by those skilled in the art that the type of the first driver 324 does not become a limitation of the features and scope of the present application.

It is worth mentioning that the controller 31, the first driver 324, and the light sensing module 40 constitute an electrically controlled adjustment system, wherein the electrically controlled adjustment system cooperatively drives the first variable diaphragm 32 and the second variable diaphragm 33 to reduce or enlarge their respective diaphragm apertures.

Through the plurality of first diaphragm plates 321 moving toward the center or spreading, the diaphragm aperture L1 of the first variable diaphragm 32 is controlled by the controller 31 and the sensor electrically controlled adjustment system to be controllably enlarged or reduced according to the instructions of the controller 31.

Preferably, each first diaphragm plate 321 is driven by the first rotating shaft 322 to rotate, so that the diaphragm aperture L1 of the first variable aperture 32 can be controlled to be enlarged or reduced.

With reference to the first preferred embodiment of the present disclosure, the implementation of the second variable diaphragm 33 is the same as the implementation of the first variable diaphragm 32.

Optionally, the implementations of the second variable diaphragm 33 and the first variable diaphragm 32 may be different. In this respect, the present application is not limited in any way.

The second variable diaphragm 33 comprises at least one second diaphragm plate 331, at least one second rotating shaft 332, a second fixed body 333, and a second driver 334, and has the diaphragm aperture L2, wherein the second diaphragm plate 331 is rotatably disposed by the second rotating shaft 332 on the second fixed body 333, and defines the diaphragm aperture L2 of the second variable aperture 33, and wherein the second driver 334 is controlled by the controller 31 to drive the second rotating shaft 332 to rotate so as to drive the second diaphragm plates 331 to rotate.

Each second diaphragm plate 331 is stacked in sequence and arranged in a circle. Since the second diaphragm plates 331 can be rotated by the second rotating shaft 332, the second diaphragm plates 331 are together far away from the center of the second variable diaphragm 33 or together close to the center of the second variable diaphragm 33 so as to realize the position of the diaphragm aperture L2 of the second variable diaphragm 33.

Preferably, the second driver 334 is implemented as a voice coil motor 334, wherein the voice coil motor 334 drives the second diaphragm plates 331 to rotate.

Optionally, the second driver 334 drives the second diaphragm plates 331 to rotate in a magnetic manner. It should be understood and known by those skilled in the art that the type of the second driver 334 does not become a limitation of the features and scope of the present application.

It is worth mentioning that the controller 31, the second driver 334, and the light sensing module 40 constitute an electrically controlled adjustment system, wherein the electrically controlled adjustment system cooperatively drives the first variable diaphragm 32 and the second variable diaphragm 33 to reduce or enlarge their respective diaphragm apertures.

Through the plurality of second diaphragm plates 331 moving toward the center or spreading, the diaphragm aperture L2 of the second variable diaphragm 33 is controlled by the controller 31 and the sensor electrically controlled adjustment system to be controllably enlarged or reduced according to the instructions of the controller 31.

Preferably, each second diaphragm plate 331 is driven by the second rotating shaft 332 to rotate, so that the diaphragm aperture L2 of the second variable aperture 33 can be controlled to be enlarged or reduced.

Figure 4:
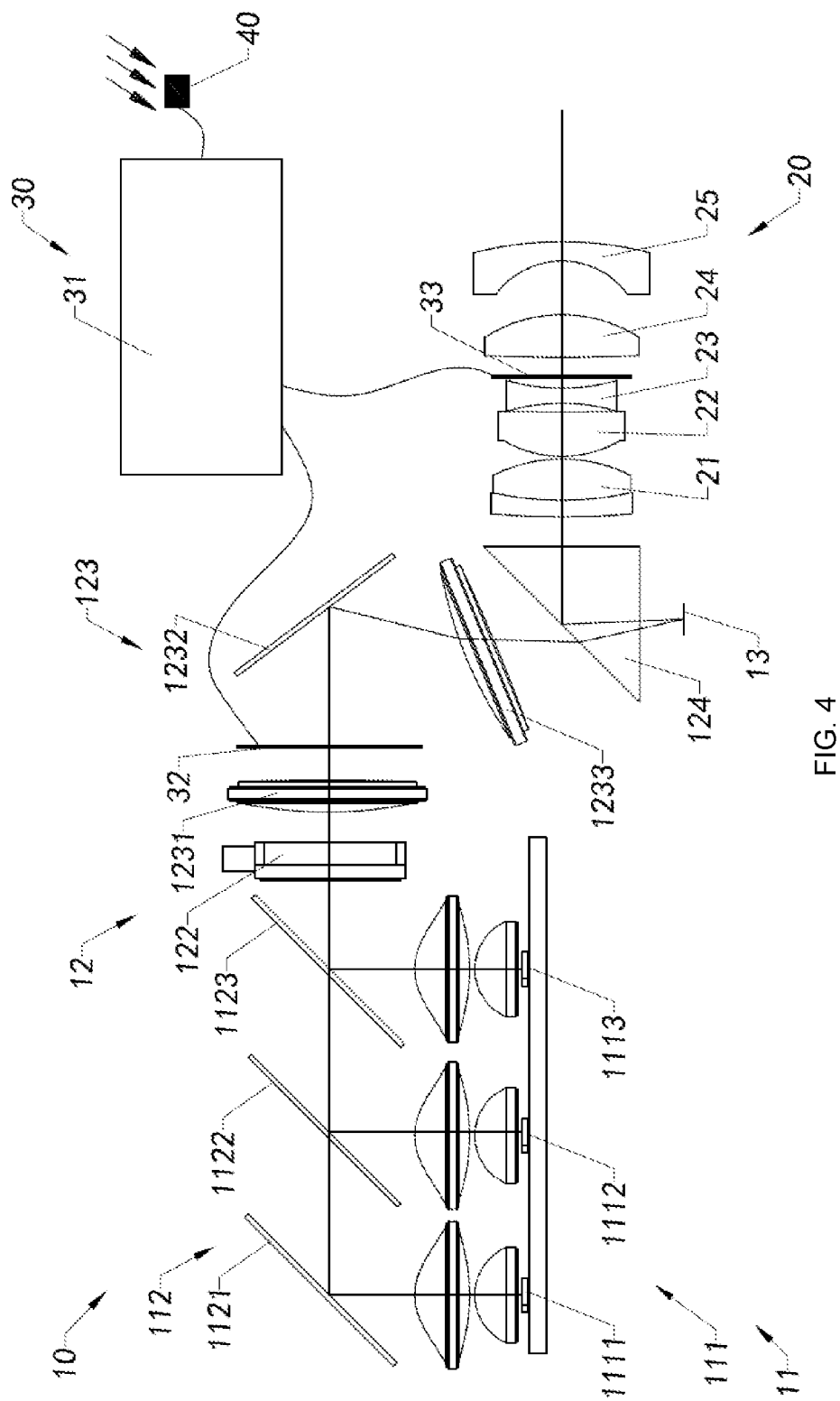
FIG. 4 is a schematic view of a projection adjustment system according to a second preferred embodiment of the present disclosure.

Referring to FIG. 4, a second preferred embodiment of the present application is disclosed and explained in detail, wherein the implementations of the illumination module 10 and the variable diaphragm control module 30 of the projection adjustment system 1 according to the second preferred embodiment are different from the implementations of the illumination module 10 and the variable diaphragm control module 30 of the projection adjustment system 1 according to the first preferred embodiment and thus it becomes a new embodiment.

According to the second preferred embodiment of the present disclosure, the first variable diaphragm 32 of the variable diaphragm control module 30 is disposed in the light processing unit 12, wherein the second variable diaphragm 32 is disposed in the projection module 20. Further, the arrangement of the effective light path of the illumination module 10 is different from that of the illumination module 10 of the first preferred embodiment.

Preferably, the light processing unit 12 comprises a fly-eye lens system 122, a relay lens system 123, and a light guide element 124. The fly-eye lens system 122 is disposed in an exit direction of the beam combining assembly 12, wherein the three-color light combined by the beam combining assembly 12 is obtained by the fly-eye lens system 122 to homogenize the light. The light homogenized by the fly-eye lens system 122 is incident on the relay lens system 123, wherein the relay lens system 123 shapes the light and then guides the light to the light guide element 124, the light guide element 124 guides the shaped light and then casts it to the imaging chip 13, and the imaging chip 13 reflects light carrying imaging information to the projection module 30.

With reference to the first preferred embodiment of the present disclosure, the fly-eye lens system 122 is implemented as a fly-eye lens 122, wherein the fly-eye lens 122 obtains the light combined by the beam combining assembly 12 and then homogenizes the light to guide the light to the relay lens system 123.

According to the second preferred embodiment of the present disclosure, the light guide element 124 is implemented as a prism 124, wherein the prism 124 obtains the light shaped by the relay lens system 123 and then guides the light to the imaging chip 13.

More preferably, the first variable diaphragm 32 is disposed on the relay lens system 123 to adjust the light flux of the light cast to the imaging unit 13 and thereby affect the brightness of the projected light.

Optionally, the first variable diaphragm 32 may be disposed in an exit direction of the fly-eye lens system 122 and disposed in the incident direction of the relay lens system 123, wherein the light homogenized by the fly-eye lens system 122 passes through the diaphragm aperture L1 of the first variable diaphragm 32 and then is cast to the relay lens system 123.

Optionally, the first variable diaphragm 32 can be disposed in an exit direction of the relay lens system 123 and disposed in the incident direction of the prism 124, wherein the light shaped by the relay lens 123 is cast to the prism 124 through the diaphragm aperture L1 of the first variable diaphragm 32, and wherein the size of the diaphragm aperture L1 of the first variable diaphragm 32 can be controlled and adjusted, so that the light flux of the light allowed to pass through the diaphragm aperture L1 of the first variable diaphragm 32 can be controlled and adjusted by the controller 31.

The relay lens system 123 further comprises a first relay lens 1231, a reflector 1232, and a second relay lens 1233. The imaging light ray in the light homogenized by the fly-eye lens system 122 is incident on the first relay lens 1231, and the light angle is adjusted by the first relay lens 1231. The reflector 1232 disposed in an exit direction of the first relay lens 1231 guides light to the second relay lens 1233. The second relay lens 1233 obtains the light reflected by the reflector 1232 and then shapes the light and casts it to the prism 124.

According to the second preferred embodiment of the present disclosure, the first variable diaphragm 32 is disposed in the exit direction of the first relay lens 1231 and disposed in the incident direction of the reflector 1232, wherein the light shaped by the first relay lens 1231 passes through the diaphragm aperture L1 of the first variable diaphragm 32 and then is cast to the reflector so as to realize the imaging and reflection of the light on the imaging chip 13, and meanwhile, by adjusting the size of the diaphragm aperture L1 of the first variable diaphragm 32, the light flux of the cast light can be adjusted.

Optionally, the first variable diaphragm 32 may be disposed in an exit direction of the reflector 1232 and disposed in the incident direction of the second relay lens 1233, so that the light guided by the reflector 1232 passes through the diaphragm aperture L1 of the first variable diaphragm 32 and then is cast to the second relay lens 1231, so as to change the light flux of the cast light by adjusting the size of the diaphragm aperture L1 of the first variable diaphragm 32, thereby changing the brightness of the projected light to adapt to the environment with different light intensities.

Optionally, the first variable diaphragm 32 may be disposed in the exit direction of the second relay lens 1233 and disposed in the incident direction of the second prism 124, so that the light guided by the second relay lens 1233 passes through the diaphragm aperture L1 of the first variable diaphragm 32 and then is cast to the prism 124, so as to realize the imaging and reflection of the light on the imaging chip 13, and meanwhile, change the light flux of the cast light by adjusting the size of the diaphragm aperture L1 of the first variable diaphragm 32, thereby changing the brightness of the projected light to adapt to the environment with different light intensities.

Optionally, the first variable diaphragm 32 may be disposed in the exit direction of the prism 124 and disposed in the incident direction of the imaging chip 13, so that the light guided by the prism 124 passes through the diaphragm aperture L1 of the first variable diaphragm 32 and then is cast to the imaging chip 13, so as to realize the imaging and reflection of light on the imaging chip 13, and meanwhile, change the light flux of the cast light by adjusting the size of the diaphragm aperture L1 of the first variable diaphragm 32, thereby changing the brightness of the projected light to adapt to the environment with different light intensities.

Preferably, the projection module 20 comprises a first lens 21, a second lens 22, a third lens 23, a fourth lens 24, and a fifth lens 25, wherein the first lens 21, the second lens 22, the third lens 23, the fourth lens 24, and the fifth lens 25 are arranged in sequence, to transmit the light carrying the imaging information to the projection plane 100, so that the cast imaging information can be received by the human eye.

It is worth mentioning that the number of lenses of the lens module 20 is not limited in any way. It should be understood and known by those skilled in the art that the lens module 20 may have a lens shape design with six surfaces or more.

In addition, the surface shape of the lens is preset, and the surface shape of the lens 21 does not become a limitation of the features and scope of the present application.

The second variable diaphragm 33 is disposed between the third lens 23 and the fourth lens 24, so that the light carrying the imaging information cast by the third lenses 23 is cast to the fourth lens 24 through the diaphragm aperture L2 of the second variable diaphragm 33, and the size of the diaphragm aperture L2 is adjusted by the second variable aperture 33 to change the intensity of the light cast by the projection adjustment system 1 and the amount of stray light from the external environment entering the projection adjustment system 1.

It is worth mentioning that the second variable diaphragm 33 is disposed at different positions according to the different surface shapes of the respective lenses. That is to say, according to specific design requirements, the second variable diaphragm 33 may be disposed at different positions in the lens module 20.

Optionally, the second variable diaphragm 33 may be disposed in the exit direction of the illumination module 10 that casts the light carrying the imaging information outward, and disposed in the incident direction of the projection module 20.

A projection adjustment method according to the third preferred embodiment of the present application is disclosed and explained in detail, wherein the projection adjustment method comprises the following steps:

(a) casting light carrying projection information outward to a projection plane 100; and (b) adjusting a light flux of the cast light by adjusting a diaphragm aperture of at least one variable diaphragm.

In the projection adjustment method according to the present disclosure, the step (a) of the projection adjustment method further comprises the following steps:

(a1) after obtaining light with predetermined light intensity, guiding the light so that the light is processed;

(a2) after obtaining the guided light, imaging the light to output light carrying imaging information; and (a3) transmitting the light to the projection plane 100.

In the projection adjustment method according to the present disclosure, the step (b) of the projection adjustment method further comprises the following steps:

(c) obtaining light intensity of an external environment; and (d) after processing an obtained external light intensity signal, controlling the diaphragm aperture of each variable diaphragm.

It is worth mentioning that after the step (b) of the projection adjustment method occurs, the step (c) of the projection adjustment method is still performed continuously. That is to say, the step (c) of the projection adjustment method is to obtain the light intensity of the external environment in real time.

Preferably, the step (b) of the projection adjustment method further comprises the following steps:

(b1) by means of a first variable diaphragm 32, controllably adjusting a size of a diaphragm aperture L1 of the first variable diaphragm 32, thereby adjusting a light flux of the light allowed to pass through; and (b2) by means of a second variable diaphragm 33, controllably adjusting a size of a diaphragm aperture L2 of the second variable diaphragm 33, thereby adjusting the light flux of the light allowed to pass through.

The step (b1) of the projection adjustment method occurs before the step (a2) of the projection adjustment method.

Preferably, the step (b1) of the projection adjustment method occurs during the step (a1) of the projection adjustment method.

The the step (b2) of the projection adjustment method occurs after the step (a2) of the projection adjustment method.

Preferably, the step (b2) of the projection adjustment method occurs during the step (a3) of the projection adjustment method.

Preferably, the step (b2) of the projection adjustment method occurs after the step (a2) of the projection adjustment method and before the step (a3) of the projection adjustment method.

Further, before the step (a1), the projection adjustment method further comprises the following steps:

(a0) after casting a three-color light, combining the light.

FIGS. 5 to 12 show some preferred implementations and partial details of a second aspect of the present application.

Figure 5:
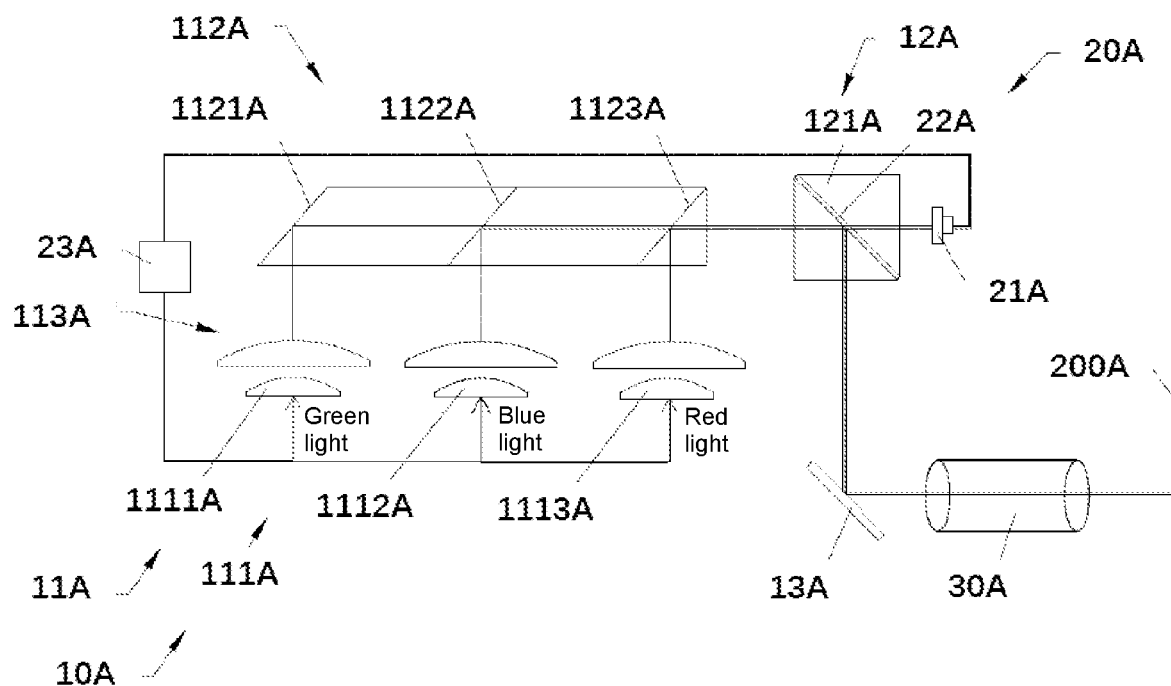
FIG. 5 is an overall schematic view according to the first preferred embodiment of the present disclosure.
Figure 6A:
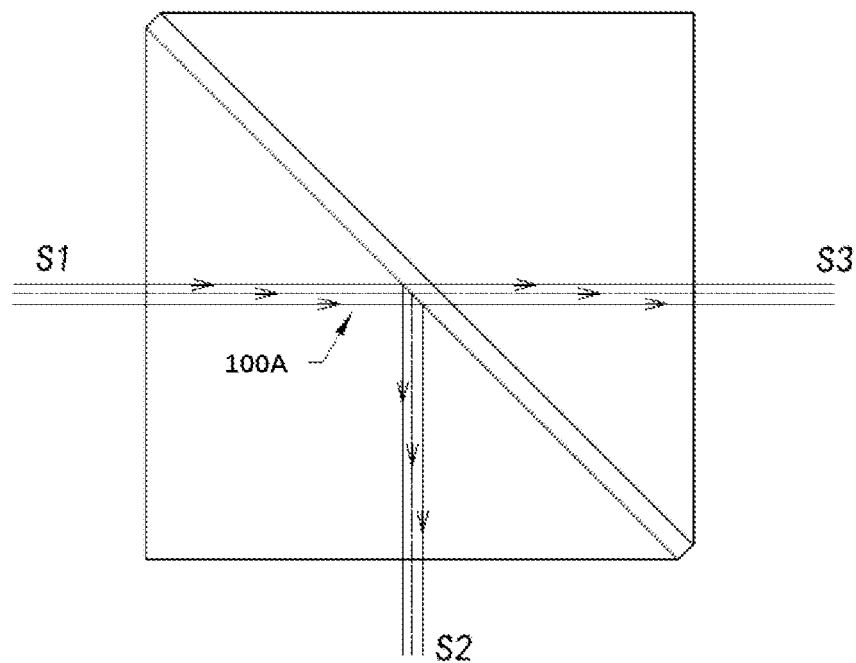
FIG. 6A is a schematic plan view of a guide unit being disposed on a prism according to the first preferred embodiment of the present disclosure.
Figure 6B:
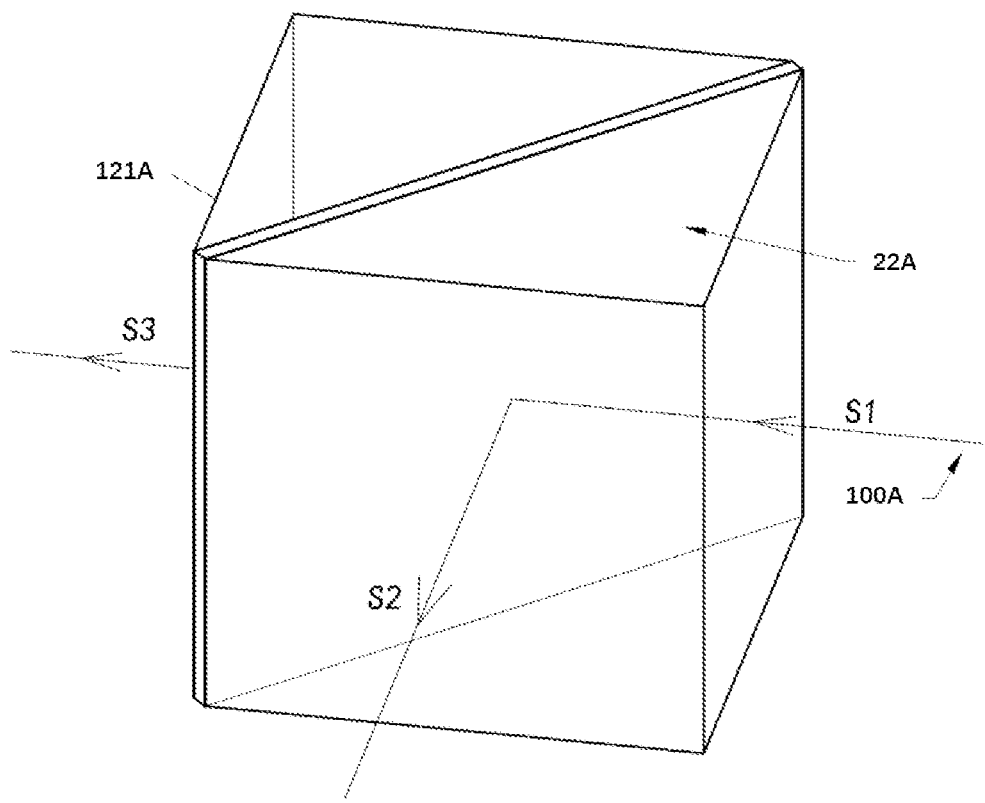
FIG. 6B is a schematic perspective view of the guide unit being disposed on the prism according to the first preferred embodiment of the present disclosure.

Referring to FIGS. 5 to 6B, a projection color adjustment system according to the first preferred embodiment of the present application is disclosed and explained in detail, wherein the projection color adjustment system comprises an illumination module 10A and a color adjustment module 20A, wherein the illumination module 10A provides effective light and then casts the light carrying the imaged presentation, and wherein the color adjustment module 20A guides the light ray for being detected in the effective light for the purpose of detecting the chromaticity value of the effective light. Since the color adjustment module 20A guides the light ray for being detected in the effective light, so that the color adjustment module 20A can guide out the light ray for being detected in real time for the purpose of sensing the chromaticity value of the light ray for being detected, the color difference value of the cast light can be adjusted in real time and stably on the premise that the imaging of the imaging light ray is not affected.

The illumination module 10A comprises a light source unit 11A, an optical element group 12A, and an imaging unit 13A. The light source unit 11A provides three colors of light to the optical element group 12A. The optical element group 12A guides the light cast by the light source unit 11A. It is worth mentioning that the optical element group 12A guides the imaging light ray in the light to the imaging unit 13A. The imaging unit 13A receives the imaging light ray guided by the optical element group 12A and reflects the light with image information.

Preferably, before the light is imaged by the imaging unit 13A, the color adjustment module 20A senses a chromaticity value of effective light on an effective light path 100A to adjust the brightness of the light cast by the light source unit 11A in real time, so that the imaging unit 13A receives the imaging light ray with the adjusted chromaticity value, and can adjust the color difference of the effective light in time, thereby improving the color accuracy of the light with the imaging presentation provided by the illumination module 10A.

It should be understood and known by those skilled in the art that the color adjustment module 20A adjusts the light characteristics including but not limited to the color temperature and brightness of the light, and the ratio of respective light colors.

Preferably, the optical element group 12A comprises but is not limited to a prism 121A, wherein the prism 121A guides a light beam to the imaging unit 13A. The imaging unit 13A reflects the light carrying the imaging presentation after imaging. It is worth noting that the prism 121A guides the effective light and corrects the light spots to improve the projection quality so as to obtain a better projection effect.

The color adjusting module 20A comprises a sensing unit 21A, a guide unit 22A, and a color difference adjustment unit 23A. The guide unit 22A is disposed on the effective light path 100A of the illumination module 10A, and the guide unit 22A guides the light ray for being detected in the effective light to the sensing unit 21A. The sensing unit 21A senses the light ray for being detected guided by the guide unit 22A, converts the chromaticity value of the light ray for being detected into an electrical signal, and then sends the converted electrical signal to the color difference adjustment unit 23A. The color difference adjustment unit 23A receives the electrical signal sent by the sensing unit 21A and then performs a color difference comparison. After that, it adjusts the color of the light cast by the three-color light source 111A.

It is worth mentioning that the guide unit 22A polarizes the light ray for being detected in the effective light to the sensing unit 21A in a polarization manner, wherein the color difference adjustment unit 23A adjusts the chromaticity value of the light cast by the light source unit 11A in a manner of adjusting the lamp beam brightness of at least one light source of the light source unit 11A.

It is further worth mentioning that the sensing unit 21A receives the light ray for being detected in the effective light, instead of receiving the stray light of the projection color adjustment system, so that the feedback adjustment accuracy of the sensing unit 21A is high, the feedback adjustment is stable, and the chromaticity value of the effective light can be detected in real time, so as to ensure the stability of the color of the projection system as a whole under different working environment temperatures.

Preferably, the guide unit 22A is disposed on the prism 121A of the optical element group 12A.

More preferably, the guide unit 22A is implemented as a polarizing element 22A, wherein the polarizing element 22A is disposed on the prism 121A of the optical element 12A. After receiving the light, the polarizing element 22A guides out the light ray for being detected in the light to the sensing unit 21A in a polarization manner, wherein the polarizing element 22A guides the imaging light ray in the light to the imaging unit 13A. It is worth noting that the amount of polarized light ray for being detected is very small.

Referring to FIGS. 6A to 6B of the present disclosure, the guide unit 22A is implemented as a polarizing film, and the guide unit 22A is disposed inside the prism 121A, so that the guide unit 22A receives light from an incident surface S1 of the prism 121A and then reflects imaging light ray in the light to exit from a first exit surface S2 of the prism 121A, and the light ray for being detected in the light is transmitted through a second exit surface S3 of the prism 121A to exit. Moreover, the guide unit 22A transmits the light ray for being detected in the effective light guided by the optical element group 12A to the sensing unit 21A without affecting the projection effect of the illumination module 10A casting the light ray for being detected, to enable the sensing unit 21A to stably receive the light ray for being detected cast by the light source unit 11A and then convert the light into an electrical signal, and then the electrical signal is sent to the color difference adjustment Unit 23A, wherein the color difference adjustment module 20A compares a chromaticity value of the received light with a chromaticity value of preset light so as to obtain a comparison difference value, and adjusts the light cast by the light source unit 11A.

More preferably, the guide unit 22A is disposed on a chamfered surface of the prism 121A in a film-coated manner, so that when light enters from the incident surface S1, the imaging light ray in the light is reflected to exit from the first exit surface S2 of the prism 121A, and the light ray for being detected in the light is transmitted by the guide unit 22A and then exits from the second exit surface S3 of the prism 121A.

It is worth noting that the guide unit 22A guides a small part of s waves or p waves.

Optionally, when the guide unit 22A makes very few s waves to be transmitted, s light is transmitted to exit from the second exit surface S3 of the prism 121A and then detected by the sensing unit 21A, and most of the light (all of p light+most of s light) is reflected by the guide unit 22A to the first exit surface S2 and then exits. The reflected light is reflected by the imaging unit to obtain the light carrying the imaging presentation, so that only a very small part of the light is guided out for color adjustment. Moreover, it can be ensured that the light used for color detection may be stably maintained. Thus, the stability of color adjustment can be ensured, and the impact on the cast presentation can be reduced.

Optionally, it should be understood and known by those skilled in the art that when the guide unit 22A makes very few p waves to be transmitted, the p-light is transmitted to exit from the second exit surface S3 of the prism 121A and then is detected by the sensing unit 21A, and most of the light (all of s light+most of p light) is reflected by the guide unit 22A to the first exit surface S2 and then exits. The reflected light is reflected by the imaging unit to obtain the light carrying the imaging presentation, so that only a very small part of the light is guided out for color adjustment. Moreover, it can be ensured that the light used for color detection may be stably maintained. Thus, the stability of color adjustment can be ensured, and the impact on the cast presentation can be reduced.

Preferably, the sensing unit 21A is held at a certain distance from the outside of the optical element group 12A, so that when the sensing unit 21A detects the light guided by the guide unit 22A, it is not affected by the radiated stray light, thereby improving the accuracy of light detection by the sensing unit 21A.

More preferably, the sensing unit 21A can be implemented as a photosensitive chip, and the chromaticity value of light is sensed by the photosensitive chip.

It is worth mentioning that the sensing unit 21A can continuously and stably receive the light ray for being detected in the effective light instead of the stray light of the projection color adjustment system, which reduces the sensitivity requirement of the sensing unit 21A, and enables the sensing unit 21A to use a low-cost photosensitive chip, thereby reducing the cost of the projection color adjustment system.

With reference to the first preferred embodiment of the present disclosure, the electrical signal detected by the sensing unit 21A includes but is not limited to the chromaticity value of the light.

Preferably, the sensing unit 21A is disposed outside the effective light path 100A through which the illumination module 10A guides the light, and the sensing unit 21A receives the light guided by the guide unit 22A and then converts the light into an electrical signal.

The light source unit 11A comprises a three-color light source 111A having a first light source 1111A, a second light source 1112A, and a third light source 1113A, and a beam combining assembly 112A having a first filter 1121A, a second filter 1122A, and a third filter 1123A. The three-color light source 111A is disposed in an incident direction of the beam combining assembly 112A, and the three-color light cast by the three-color light source 111A is combined by the beam combining assembly 112A and then is cast outward.

The first light source 1111A, the second light source 1112A, and the third light source 1113A are arranged in sequence. The first filter 1121A is disposed on a light exit path of the first light source 1111A, wherein the second filter 1122A is disposed on a light exit path of the second light source 1112A, and the third filter 1123A is disposed on a light exit path of the third light source 1113A, and wherein the light exit paths of cast light of the first light source 1111A, the second light source 1112A, and the third light source 1113A are in the same direction, so that the light source unit 11A is arranged in a plane manner to reduce the space occupied by the light source unit 11A, thereby further reducing the volume of the illumination module 10A.

Preferably, the first light source 1111A, the second light source 1112A, and the third light source 1113A project light of three colors of green, blue, and red, respectively. Furthermore, the first light source 1111A casts green light, wherein the second light source 1112A casts blue light, and wherein the third light source 1113A casts red light. The three-color light source is cast in such a manner that the color of the projection color adjustment system is more vivid. Further, the first filter 1121A reflects green light and transmits red and blue light, wherein the second filter 1122A reflects blue light and transmits green and red light, and wherein the third filter 1123A reflects red light and transmits blue and green light, so that the beam combining assembly 112A combines the red light, blue light and green light to the prism 121A.

The light source unit 11A comprises a collimating portion 113A, wherein the collimating portion 113A collimates the light cast by the three-color light source. Further, the first light source 1111A, the second light source 1112A, and the third light source 1113A each cast light outward, and the light is collimated by the collimating portion 113A, so that the light source unit 11A provides a collimated three-color light.

Preferably, the collimating portion 113A is disposed on the exit path of each of the first light source 1111A, the second light source 1112A, and the third light source 1113A, so that the collimating portion 113A collimates the light emitted from the first light source 1111A, the second light source 1112A, and the third light source 1113A. Further, the collimating portion 113A is implemented as three collimating lens pieces, and the collimating lens pieces are on the exit paths of the first light source 1111A, the second light source 1112A, and the third light source 1113A, respectively, so that the cast RGB light is collimated.

Preferably, the beam combining assembly 112A is implemented as a plurality of filters for filtering different colors, wherein the RGB light emitted by the light source unit 11A is combined by the beam combining assembly 112A.

More preferably, the beam combining assembly 112A is disposed on the exit paths of the first light source 1111A, the second light source 1112A, and the third light source 1113A. Further, the first color filter 1121A is disposed on the exit path of the first light source 1111A at a certain distance, wherein the second color filter 1122A is disposed on the exit path of the second light source 1112A at the same distance, and wherein the third color filter 1123A is disposed on the exit path of the third light source 1113A at the same distance, so that the light exit paths of light cast by the first light source 1111A, the second light source 1112A, and the third light source 1113A are close to the same straight line.

Furthermore, the projection color adjustment system comprises a projection module 30A, wherein the projection module 30A is disposed in the exit direction of the imaging unit 13A, so that the light carrying the imaging presentation reflected by the imaging unit 13A is transmitted by the projection module 30A, and then is projected onto a projection plane 200A. The color adjustment module 20A guides the effective light to the color difference adjustment unit 23A, wherein the color difference adjustment unit 23A adjusts the color of the three-color light source 111A to ensure the real-time light color of the illumination module 10A.

It is worth mentioning that the projection color adjustment system may be applied to a MEMS system and a PGU system, so that the PGU system or the MEMS system may adjust the color difference value of the cast light in real time to improve the color accuracy of projection of the PGU system or the MEMS system. When the projection color adjustment system can be applied to the MEMS system, the imaging unit 13A is implemented as a MEMS chip. When the projection color adjustment system may be applied to the PGU system, the imaging unit 13A may be implemented as a DMD chip, and the type of the imaging unit 13A is not limited in the present application.

It is worth mentioning that the modified implementation of the first preferred embodiment of the present application is disclosed and explained in detail in the following paragraphs, and the guide unit 22A may be implemented as a polarizer and disposed on one side of the prism 121A in a bonding manner, so that the guide unit 22A deviates the light ray for being detected from the effective light to the sensing unit 21A.

Optionally, it should be understood and known by those skilled in the art that when the guide unit 22A is implemented as a polarizer, the guide unit 22A may be disposed on the effective light path 100A of the effective light, and the position where the guide unit 22A is disposed is not limited.

Optionally, the guide unit 22A may be disposed between the light source unit 11A and the optical element group 12A, so that the light ray for being detected in the light cast by the light source unit 11A can be guided out by the guide unit 22A in a polarization manner, so that the light ray for being detected in the light may be used for color adjustment, and the imaging light ray in the light may be cast to the imaging unit 13A for projection, and so that after the imaging light ray of the effective light is projected, the imaged projection effect will not be affected.

Optionally, the guide unit 22A may be disposed in the optical element group 12A. For example, the guide unit 22A is disposed on the incident path of the prism 121A or the light exit path of the prism 121A in a bonding manner.

Optionally, the guide unit 22A may be disposed between the optical element 12A and the imaging unit 13A, wherein the guide unit 22A guides the polarized light in the effective light in a polarization manner, so that the light ray for being detected is used for detection, and the imaging unit 13A receives imaging light ray whose color is adjusted in real time, which more conveniently solves the color difference problem of imaging in the imaging unit 13A.

Optionally, the guide unit 22A may be disposed in the exit direction of the imaging unit 13A, wherein after the imaging unit 13A receives the light, the imaging unit 13A performs imaging and then reflects the light carrying the imaging presentation, and wherein the guide unit 22A transmits the light ray for being detected in the light carrying the imaging presentation in a polarization manner, and the light ray for being detected carried in the light can be used for detecting the color difference value of the effective light in real time without affecting the projection effect of the light carrying the imaging presentation.

Figure 7:
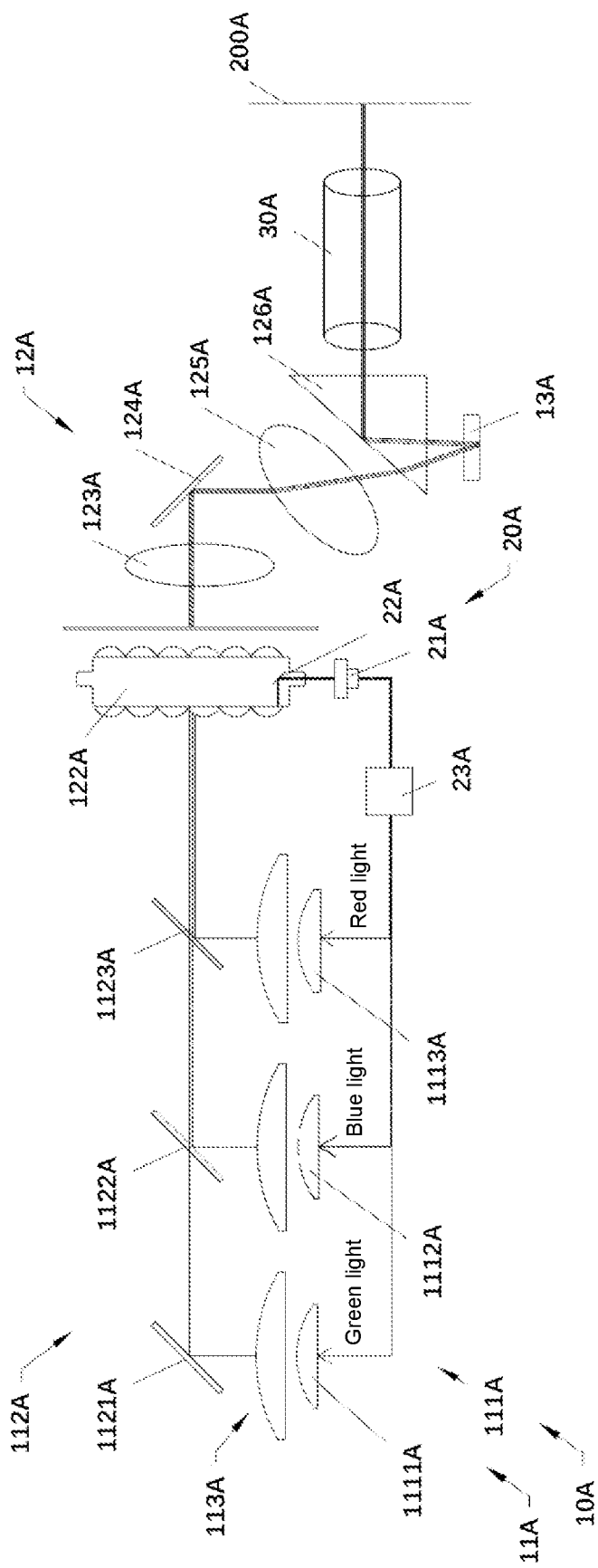
FIG. 7 is an overall schematic diagram according to the second preferred embodiment of the present disclosure.
Figure 8A:
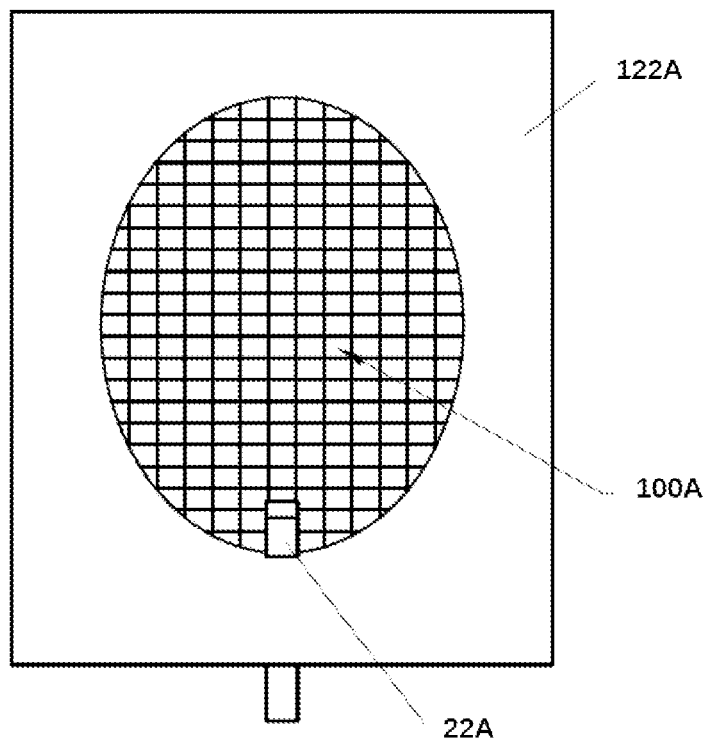
FIG. 8A is a plan view of a front of a fly-eye lens system according to the second preferred embodiment of the present disclosure.
Figure 8B:
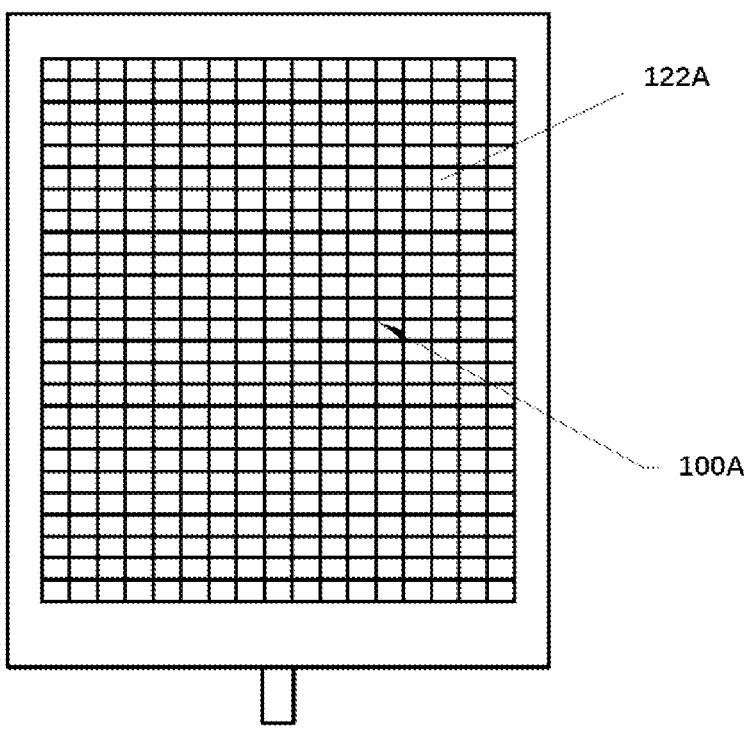
FIG. 8B is a plan view of a back of the fly-eye lens system according to the second preferred embodiment of the present disclosure.

Referring to FIGS. 7 to 8B, the second preferred embodiment of the present application is disclosed and explained in detail, wherein the projection color adjustment system is different from the first preferred embodiment and thus it becomes a new embodiment, and wherein the optical element group 12A comprises at least one fly-eye lens system 122A, a first relay lens 123A, a reflector 124A, a second relay lens 125A, and a prism 126A. The guide unit 22A is disposed in the fly-eye lens system 122A and guides out the light ray for being detected in the effective light, so that the light ray for being detected in the effective light rays guided out by the guide unit 22A may be used for sensing. The fly-eye lens system 122A is disposed in the exit direction of the beam combining assembly 112A, and homogenizes the light after receiving the light combined by the beam combining assembly 112A. The imaging light ray of the light homogenized by the fly-eye lens system 122A is incident on the first relay lens 123A, and the light angle is adjusted by the first relay lens 123A. The reflector 124A disposed in the exit direction of the first relay lens 123A reflects the light whose light angle is adjusted. The second relay lens 125A further shapes the light and casts it to the prism 126A. The prism 126A guides the shaped light and then casts it to the DMD chip 13A, and the DMD chip 13A reflects the imaged light to the projection module 30A.

Preferably, the fly-eye lens system 122A is implemented as a fly-eye lens.

It is worth noting that the first relay lens 123A, the reflector 124A, and the second relay lens 125A constitute a relay lens system, which realizes the guidance of the effective light and shapes the effective light so as to improve the projection effect.

It is worth noting that the effective light refers to the light in the effective light path 100A, rather than the stray light radiated to the environment.

Referring to FIGS. 8A to 8B, the guide unit 22A is disposed on the fly-eye lens system 122A. Furthermore, the guide unit 22A is disposed on the effective light path 100A where the fly-eye lens system 122A homogenizes the light combined by the beam combining assembly 112A, so that the guide unit 22A may guide a part of the light to deviate from the effective light path 100A and be guided to the sensing unit 21A, and thus the guide unit 22A can provide a small amount of stable light applied for color adjustment, thereby ensuring the stability of the color adjustment module 20A. Furthermore, the sensing unit 21A can continuously receive effective light, so that a low-cost photosensitive detection chip can be applied to save the cost of the projection color adjustment system.

Preferably, the guide unit 22A is implemented as a light guide column 22A, and may guide the light ray for being detected in the light to the sensing unit 21A.

Optionally, the guide unit 22A may be implemented as a light guide channel 22A of one lens piece in the optical element group. More optionally, the guide unit 22A may be disposed on the fly-eye lens system 122A, so that the guide unit 22A is implemented as the light guide channel 22A of the fly-eye system 122A. It is worth mentioning that the light guide unit 22A is disposed on the effective light path, so that the combined light is cast to the fly-eye lens system 122A, wherein the imaging light ray in the light is cast to the first fly-eye lens 112A, and wherein the light ray for being detected in the light in is guided through the light guide channel 22A and then cast to the sensing unit 21A. In addition, the light guide unit 22A may be disposed on the first relay lens 123A, the reflector 124A, the second relay lens 125A or the prism 126A.

It is worth mentioning that the sensing unit 21A is disposed on a side part of the fly-eye lens system 122A, and can receive the light guided by the guide unit 22A, so that the sensing unit 21A is far away from the effective light path 100A without being affected by stray light.

The sensing unit 21A sends the converted electrical signal to the color difference adjustment unit 23A, and the color difference adjustment unit 23A adjusts the brightness of the light of the first light source 1111A, the second light source 1112A, and the third light source 1113A of the three-color light source 111A, respectively.

It is worth mentioning that the guide unit 22A may be implemented as a light guide lens piece and is different from the second preferred embodiment to become another implementation of the second preferred embodiment, wherein the guide unit 22A is a lens piece provided with a reflective coating, so that a part coated with the reflective coating reflects the light ray for being detected in the light, whereas a part not coated with the reflective coating allows the imaging light ray in the light to be cast out in a transmission manner, and wherein the reflective coating of the guide unit 22A guides the detecting light ray in the light to the sensing unit 21A.

Optionally, the reflective coating of the guide unit 22A may be implemented as a reflector, and in this respect, the present application is not limited in any way.

Figure 9:
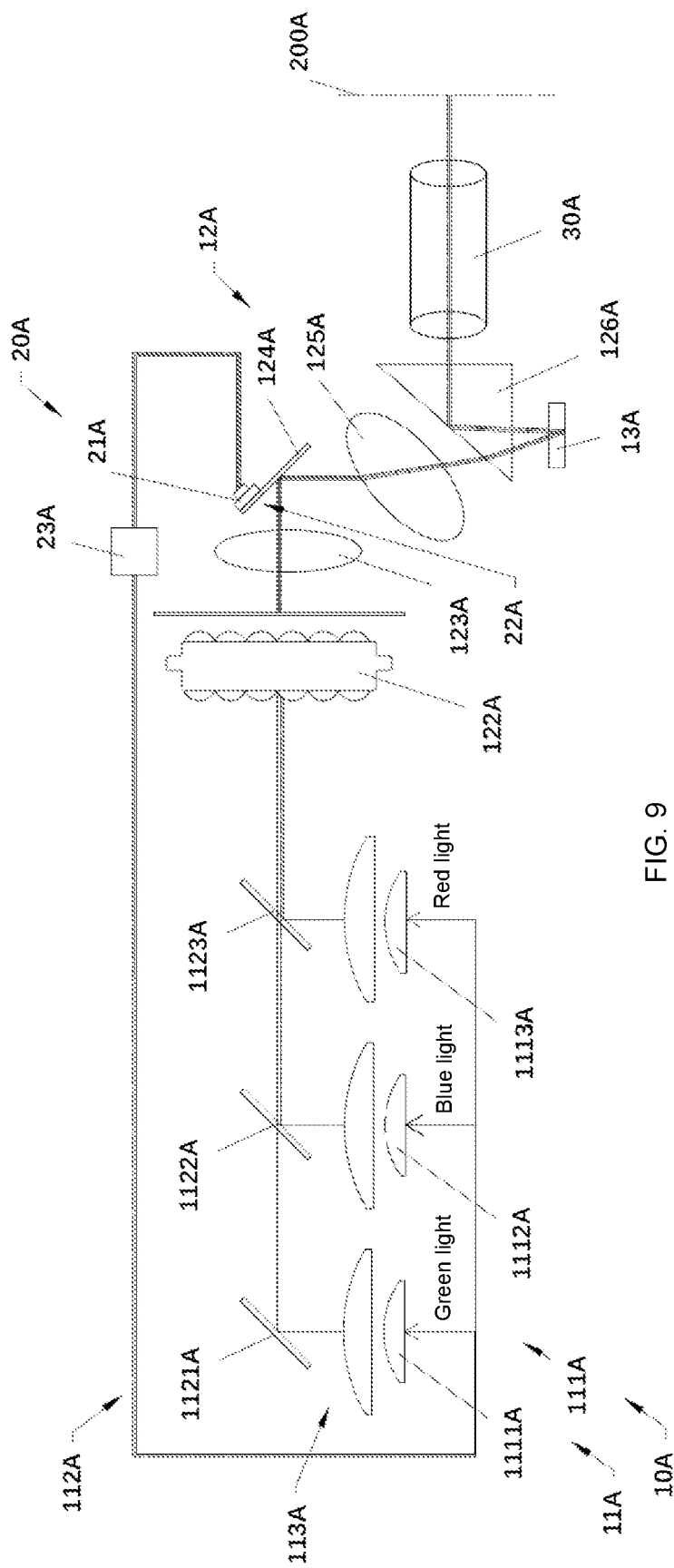
FIG. 9 is an overall schematic diagram according to a third preferred embodiment of the present disclosure.
Figure 10:
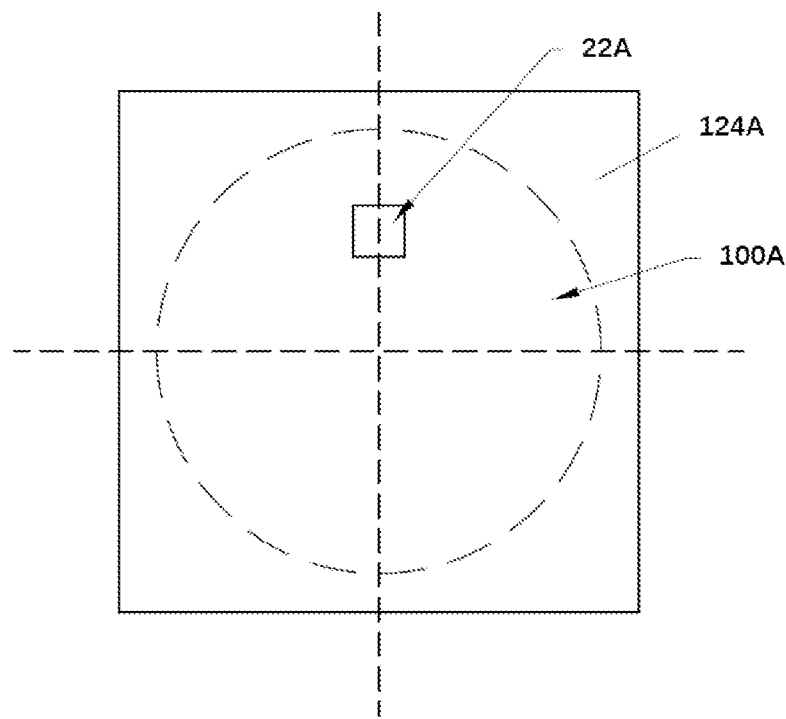
FIG. 10 is a front view of a color adjustment module being disposed on a reflector according to the third preferred embodiment of the present disclosure.
Figure 11:
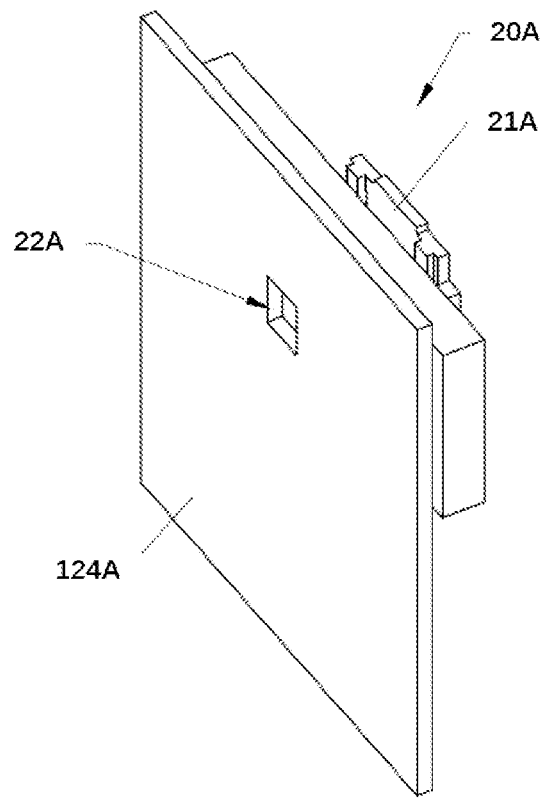
FIG. 11 is a perspective view of the color adjustment module being disposed on the reflector according to the third preferred embodiment of the present disclosure.

Referring to FIGS. 9 to 11, the third preferred embodiment of the present application is disclosed and explained in detail, wherein the projection color adjustment system is different from the light guide manner of the projection color adjustment system according to the second preferred embodiment and thus it becomes a new embodiment.

The guide unit 22A is disposed on the reflector 124A of the optical element group 12A, and transmits the light ray for being detected in the light to the sensing unit 21A, so that the light ray for being detected is separated from the imaging light ray without being reflected to the second relay lens 125A, and the light ray for being detected is used for color adjustment while not affecting the imaging light ray to be used for projection.

The guide unit 22A is implemented as a light-transmitting element 22A, which guides out the light ray for being detected in the light in a transmission manner, so that the light ray for being detected is transmitted by the light-transmitting element 22A and separated from the imaging light ray. After that, the transmitted light is sensed by the sensing unit 21A, so that the sensing unit 21A can sense the chromaticity value of the effective light in real time.

Preferably, the guide unit 22A is implemented as a through hole of the reflector 124A, and the guide unit 22A of the reflector 124A is disposed in the range of the effective light path 100A, so that the light ray for being detected, as a small part in the light, is cast to the sensing unit 21A through the guide unit 22A, and most of the light is reflected by the reflector 124A to the second relay lens 125A, thereby ensuring that the color adjustment module 20A can receive stable light in real time.

It is worth noting that the guide unit 22A is implemented as the through hole of the reflector 124A, wherein the shape of the guide unit 22A may be semicircular, circular, square, or other polygons, and is not limited in any way in the present application.

Preferably, the sensing unit 21A is disposed behind the reflector 124A and may receive the light from the guide unit 22A, so that the sensing unit 21A may receive the guided light in real time and convert it into an electrical signal.

With reference to the third preferred embodiment of the present disclosure, the sensing unit 21A sends the converted electrical signal to the color difference adjustment unit 23A, wherein the color difference adjustment unit 23A compares the chromaticity value carried by the electrical signal with a preset chromaticity value for comparison, and adjusts the color of the three-color light source 111A according to the color difference value.

Figure 12:
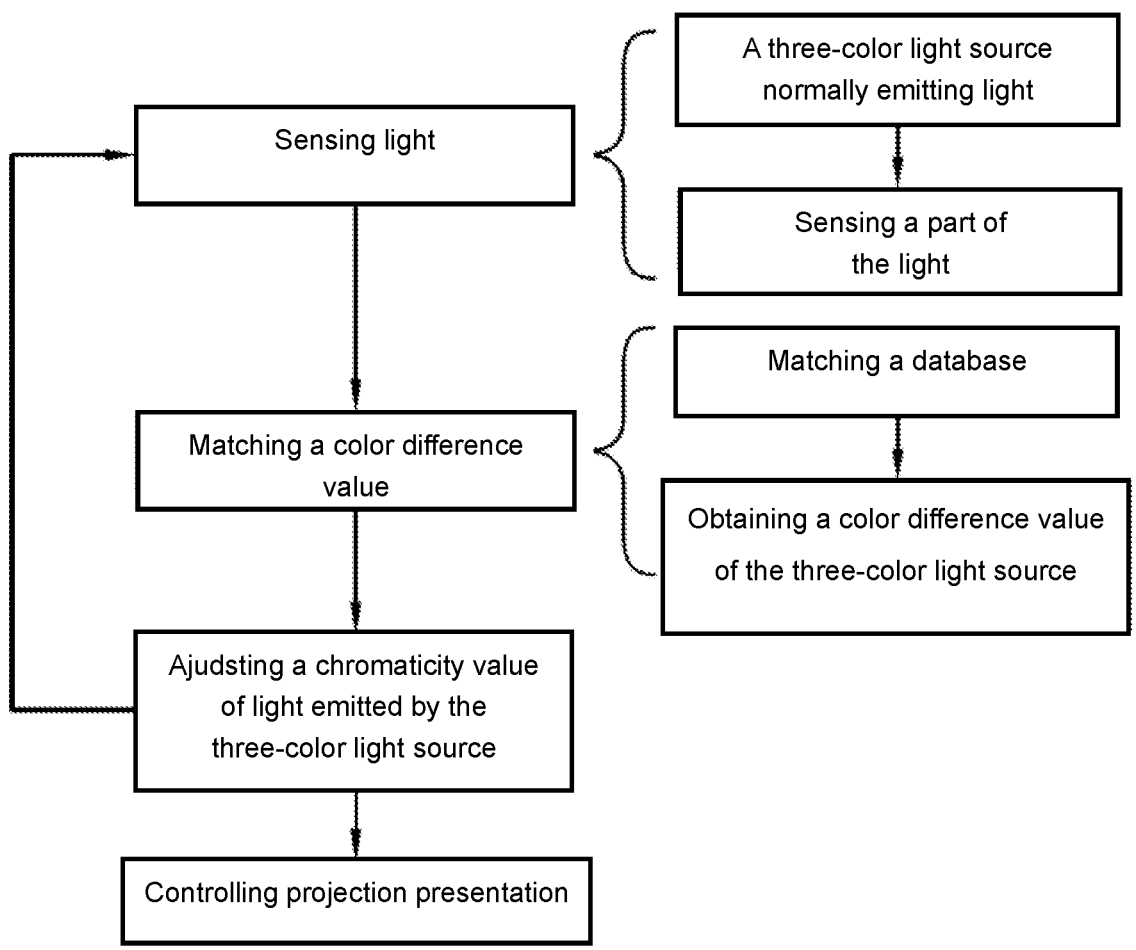
FIG. 12 is a schematic view of a projection color adjustment method according to the present disclosure.

Referring to FIG. 12, a projection color adjustment method of the present application is disclosed and explained in detail, wherein the projection color adjustment method comprises the following steps:

(a) sensing light ray for being detected in the light guided out from a light path;

(b) matching a color difference value of the light ray for being detected in real time; and (c) adjusting a color difference value of light cast by a three-color light source 111A.

Preferably, the step (a) of the projection color adjustment method further comprises the following steps:

(a1) emitting light by means of the three-color light source 111A;

(a2) guiding light ray for being detected in the light; and (a3) detecting the light ray for being detected cast in real time.

Preferably, the step (b) of the projection color adjustment method further comprises the following steps:

(b1) comparing a chromaticity value of the light that is sensed with a preset database; and (b2) obtaining the color difference value of the light cast by the three-color light source 111A.

Preferably, the step (c) of the projection color adjustment method further comprises the following steps:

(c1) adjusting the brightness of light cast by the three-color light source 111A in a manner of controlling a lamp bead flow rate of the three-color light source 111A.

In the step (c1) of the projection color adjustment method, controlling the three-color light source 111A comprises, but is not limited to, adjusting the brightness and color temperature of the three-color light source 111A, and a color ratio between monochromatic light sources.

Preferably, the step (a3) of the projection color adjustment method further comprises the following steps:

(a31) disposing a sensing unit 21A on a light path of the light ray for being detected, for sensing the chromaticity value of the light ray for being detected.

Optionally, the step (a2) of the projection color adjustment method further comprises the following steps:

(a21) by means of a light-transmitting element 22A disposed on a reflector 124A, guiding out the light ray for being detected in the light in a transmission manner.

The step (a21) of the projection color adjustment method further comprises the following steps:

(a211) by means of a through hole 22A disposed in the reflector 124A, guiding out the light ray for being detected in a transmission manner.

In the step (a211) of the projection color adjustment method, the guide unit 22A is implemented as the through hole 22A of the reflector 124A, and the through hole 22A is disposed on the effective light path of the light, and guides out the light ray for being detected in the light in a transmission manner, so that the imaging light ray is guided separately from the light ray for being detected.

The step (a31) of the projection color adjustment method further comprises the following steps:

(a311) disposing a sensing unit 21A on the light-transmitting side of the through hole 22A of the reflector 124A, and receiving the light ray for being detected transmitted through the reflector 124A; and (a312) sensing the chromaticity value of the light ray for being detected.

It is worth mentioning that after the step (a211) of the projection color adjustment method is executed, the step (a311) of the projection color adjustment method is executed.

Optionally, the step (a2) of the projection color adjustment method further comprises the following steps:

(a21') by means of a light guide column 22A disposed on the effective light path, guiding out the light ray for being detected in the light in a light guide manner.

The step (a31) of the projection color adjustment method further comprises the following steps:

(a311') disposing the sensing unit 21A on a light exit side of the light guide column 22A, and receiving the light ray for being detected guided out by the light guide column 22A; and (a312') sensing the chromaticity value of the light ray for being detected.

It is worth mentioning that after the step (a21') of the projection color adjustment method is executed, the step (a311') of the projection color adjustment method is executed.

Optionally, the step (a2) of the projection color adjustment method further comprises the following steps:

(a21") by means of a polarizing element 22A disposed on the effective light path, guiding out the light ray for being detected in the light in a polarization manner.

In this step, the polarizing element 22A transmits the light ray for being detected in the light to the sensing unit 21A in a polarization manner, and reflects the imaging light ray in the light to the imaging unit 13A, so that the light ray for being detected and the imaging light ray are separated by the polarizing element 22A, and it does not affect the imaging light ray to be used for imaging.

The step (a21") of the projection color adjustment method further comprises the following steps:

(a211') by means of a polarizing film 22A coated on an optical lens piece, guiding out the light ray for being detected in the light in a polarization manner.

In the step (a211') of the projection color adjustment method, the polarizing film 22A is disposed on a prism 121A, and the polarizing film 22A may receive effective light, and after the polarizing film 22A receives effective light, the light ray for being detected in the light is transmitted in a polarization manner, and the imaging light ray in the light is reflected, so that the light ray for being detected and the imaging light ray of the light are polarized separately.

The step (a31) of the projection color adjustment method further comprises the following steps:

(a311') disposing the sensing unit 21A on a light-transmitting side of the polarizing film 22A, and receiving the light ray for being detected transmitted through the reflector 124A; and (a312') sensing the chromaticity value of the light ray for being detected.

It is worth mentioning that after the step (a211') of the projection color adjustment method is executed, the step (a311') of the projection color adjustment method is executed.

Optionally, the step (a21") of the projection color adjustment method further comprises the following steps:

(a211''') by means of a polarizing lens piece 22A disposed on the effective light path, guiding out the light ray for being detected in the light in a polarization manner.

It should be understood and known by those skilled in the art that the polarizing lens piece 22A in the step (a211''') of the projection color adjustment method may be disposed before the imaging light ray is imaged by an imaging unit 13A, or may be disposed after the imaging light ray is imaged and then carries the imaged presentation to be reflected.

The polarizing lens piece 22A may be disposed at various positions on the effective light path, to reflect the imaging light ray in the light to the imaging unit 13A, and to transmit the light ray for being detected in the light to the sensing unit 21A, so as to monitor the chromaticity value of the light in real time without affecting the projection effect.

The step (a31) of the projection color adjustment method further comprises the following steps:

(a311''') disposing the sensing unit 21A on a light-transmitting side of the polarizing lens piece 22A, and receiving the light ray for being detected transmitted through the reflector 124A; and (a312''') sensing the chromaticity value of the light ray for being detected.

It is worth mentioning that after the step (a211''') of the projection color adjustment method is executed, the step (a311''') of the projection color adjustment method is executed.

Optionally, the step (a2) of the projection color adjustment method further comprises the following steps:

(a21') by means of a light guide channel 22A disposed in one lens piece of the optical element group 12A, guiding out the light ray for being detected in the light in a light guide manner.

The step (a31) of the projection color adjustment method further comprises the following steps:

(a311') disposing the sensing unit 21A on a light exit side of the light guide channel 22A, and receiving the light ray for being detected guided out by the light guide channel 22A; and (a312') sensing the chromaticity value of the light ray for being detected.

The implementations of multiple embodiments can be freely combined, and in this respect, the present application is not limited in any way.

It should be understood by those skilled in the art that the embodiments of the present disclosure described in the above description and shown in the drawings are only examples and do not limit the present application. The objectives of the present application have been achieved completely and efficiently. The function and structural principles of the present disclosure have been presented and described in the embodiments, and the implementations of the present disclosure may be varied or modified without departing from the principles.

What is claimed is:

1. A projection color adjustment system, comprising:
   an illumination module, wherein the illumination module comprises a light source unit, an optical element group, and an imaging unit, wherein the light source unit provides light to the optical element group, and the optical element group guides an imaging light ray in effective light to the imaging unit, and wherein the imaging light ray is reflected by the imaging unit to form light carrying an imaging presentation;
   a color adjustment module, wherein the color adjustment module is disposed on an exit path of the light source unit, and wherein the color adjustment module guides out light ray for being detected from the effective light in real time for color adjustment of the illumination module; and
   a projection module, the projection module casting the adjusted imaging light ray to form a presentation on a projection plane;
   wherein after the imaging unit receives the imaging light ray whose color is adjusted in real time, the imaging unit reflects the light carrying the imaging presentation to the projection module;
   wherein the color adjustment module comprises a guide unit and a sensing unit, and the guide unit guides out the light ray for being detected in the light to the sensing unit; p2 (i) the guide unit is disposed on an exit path of the optical element group and on an incident path of the imaging unit, to sense the chromaticity value of the light in a manner of guiding out the light ray for being detected in the light;
   (ii) the guide unit is disposed on an exit path of the imaging unit, to sense the chromaticity value of the light in a manner of guiding out the light ray for being detected in the light;
   (iii) the guide unit is disposed on the optical element group, wherein the optical element group comprises at least one optical lens piece, and the guide unit is disposed on the optical lens piece, to sense the chromaticity value of the light in a manner of guiding out the light ray for being detected in the light, wherein the guide unit has a light guide column as a guide element, and the guide element guides out the light ray for being detected in the light to the sensing unit in real time; and wherein the optical lens piece, where the light guide column is located, is a fly-eye lens system; or
   (iv) the optical element group comprises at least one optical lens piece, and wherein the guide unit is a through hole of the optical lens piece so as to transmit the light ray for being detected in the light to the sensing unit, and wherein the optical element group further comprises a first relay lens and a second relay lens, wherein the optical lens piece is between the first relay lens and the second relay lens, and wherein the optical lens piece is a reflector sheet configured to reflect the light.

2. The projection color adjustment system according to claim 1, wherein the sensing unit senses a chromaticity value of the light ray for being detected in real time; and wherein the guide unit is disposed on a light path of the optical element group, and the guide unit guides the light ray for being detected, other than the imaging light ray in the light, to the sensing unit.

3. The projection color adjustment system according to claim 2, wherein the color adjustment module further comprises a color difference adjustment unit, wherein the color difference adjustment unit receives the real-time chromaticity value of the light ray for being detected, provided by the sensing unit, to obtain a color difference value of the light ray for being detected, and then adjusts a chromaticity value of the light provided by the light source unit.

4. The projection color adjustment system according to claim 3, the light source unit comprising at least three light sources, wherein the color difference adjustment unit adjusts lamp bead brightness of each light source in a manner of adjusting an electrical current of each light source.

5. The projection color adjustment system according to claim 1, further comprising a variable diaphragm control module, wherein the variable diaphragm control module comprises at least one variable diaphragm and a controller, and wherein each variable diaphragm adjusts at least one diaphragm aperture of the variable diaphragm under the control of the controller, and light intensity of the light cast outward is adjusted by reducing or enlarging the diaphragm aperture.

6. The projection color adjustment system according to claim 5, wherein the variable diaphragm control module comprises a first variable diaphragm, and wherein the first variable diaphragm is controlled by the controller to adjust a size of its diaphragm aperture; and wherein the first variable diaphragm is disposed on a light path of the illumination module; and wherein the first variable diaphragm is disposed in an incident direction of the imaging unit, and regulates a light flux of light passing through it before the light is imaged by the imaging unit; and wherein a position of the first variable diaphragm is selected from a position group consisting of a position disposed in an exit direction of the light source unit and in an incident direction of a light processing unit, a position where the first variable diaphragm is disposed on a light path of a light processing unit, and a position disposed in an exit direction of a light processing unit and disposed in an incident direction of the imaging unit.

7. The projection color adjustment system according to claim 6, wherein the variable diaphragm control module further comprises a second variable diaphragm, and wherein the first variable diaphragm and the second variable diaphragm are controlled by the controller to adjust their respective diaphragm apertures; and wherein a position where the second variable diaphragm is disposed is selected from a position group consisting of a position disposed in an exit direction of the illumination module and in an incident direction of the projection module, and a position disposed on a light path of the projection module.

8. The projection color adjustment system according to claim 5, further comprising a light sensing module, wherein the light sensing module obtains light intensity of an external environment and then sends a light intensity electric signal to the controller, and wherein each variable diaphragm is controlled by the controller in a coordinated manner to adjust the respective diaphragm aperture.

9. The projection color adjustment system according to claim 1, wherein the guide unit of the optical lens piece is disposed in a range of an effective light path of the light.

10. The projection color adjustment system according to claim 1, wherein a portion of the light cast to the sensing unit through the guide unit is smaller than a portion of the light reflected by the reflector sheet to the second relay lens.

11. The projection color adjustment system according to claim 1, wherein the optical element group has a plurality of optical lens pieces, and the fly-eye lens system is positioned as the first optical lens piece in the optical element group along the exit path of the light source unit.

12. A projection color adjustment method, comprising the following steps:
   (a) sensing light ray for being detected in the light guided out from a light path;
   wherein the step (a) of the projection color adjustment method further comprises:
   providing an illumination module, comprising a light source unit, an optical element group, and an imaging unit, wherein the light source unit provides light to the optical element group, and the optical element group guides the light ray in effective light to the imaging unit, and wherein the light ray is reflected by the imaging unit to form light carrying an imaging presentation; and
   providing a guide unit and a sensing unit, and wherein the guide unit guides out the light ray for being detected in the light to the sensing unit;
   wherein:
      (i) the guide unit is disposed on an exit path of the optical element group and on an incident path of the imaging unit, to sense the chromaticity value of the light in a manner of guiding out the light ray for being detected in the light;
      (ii) the guide unit is disposed on an exit path of the imaging unit, to sense the chromaticity value of the light in a manner of guiding out the light ray for being detected in the light;
      (iii) the guide unit is disposed on the optical element group, wherein the optical element group comprises at least one optical lens piece, and the guide unit is disposed on the optical lens piece, to sense the chromaticity value of the light in a manner of guiding out the light ray for being detected in the light, wherein the guide unit has a light guide column as a guide element, and the guide element guides out the light ray for being detected in the light to the sensing unit in real time; and wherein the optical lens piece, where the light guide column is located, is a fly-eye lens system; or
      (iv) the optical element group comprises at least one optical lens piece, and wherein the guide unit is a through hole of the optical lens piece so as to transmit the light ray for being detected in the light to the sensing unit, and wherein the optical element group further comprises a first relay lens and a second relay lens, wherein the optical lens piece is between the first relay lens and the second relay lens, and wherein the optical lens piece is a reflector sheet configured to reflect the light;
   (b) matching a color difference value of the light ray for being detected in real time; and
   (c) adjusting a color difference value of light cast by at least one light source;
   wherein the step (b) of the projection color adjustment method further comprises the following steps:
   (b1) comparing a chromaticity value of the light ray for being detected that is sensed with a preset database; and
   (b2) obtaining a color difference value of light cast by each light source;
   wherein the step (c) of the projection color adjustment method further comprises the following steps:
   (c1) adjusting brightness of light cast by a three-color light source in a manner of controlling a lamp bead flow rate of the three-color light source;
   and wherein the step (a) of the projection color adjustment method further comprises the following steps:
   (a1) before the light is imaged, guiding out the light ray for being detected in the light in real time; and
   (a2) sensing the light guided out in real time.

13. The projection color adjustment method according to claim 12, wherein the optical element group has a plurality of optical lens pieces, and the fly-eye lens system is positioned as the first optical lens piece in the optical element group along the exit path of the light source unit.

14. The projection color adjustment method according to claim 12, further comprising an additional step of adjusting a light flux of the cast light by adjusting a diaphragm aperture of at least one variable diaphragm;
   wherein before this additional step, the method comprises the following steps:
   obtaining light intensity of an external environment in real time; and
   after processing an obtained external light intensity signal, controlling the diaphragm aperture of each variable diaphragm;
   and wherein this additional step further comprises the following steps:
   by means of a first variable diaphragm, controllably adjusting a size of a diaphragm aperture of the first variable diaphragm, thereby adjusting a light flux of the light allowed to pass through; and
   by means of a second variable diaphragm, controllably adjusting a size of a diaphragm aperture of the second variable diaphragm, thereby adjusting the light flux of the light allowed to pass through.

* * * * *